(12) United States Patent
Briggs, IV et al.

(10) Patent No.: US 11,673,638 B2
(45) Date of Patent: Jun. 13, 2023

(54) ROBOTIC SOLUTION TO PENETRATE AND MANEUVER THROUGH SLUDGE AND SEDIMENT

(71) Applicant: APPLIED IMPACT ROBOTICS, INC, Sterling, VA (US)

(72) Inventors: Fred Melvelle Briggs, IV, Ashburn, VA (US); Brandon Pollett Wernick, Rockville, MD (US)

(73) Assignee: APPLIED IMPACT ROBOTICS, INC, Sterling, VA (US)

( * ) Notice: Subject to any disclaimer, the term of this patent is extended or adjusted under 35 U.S.C. 154(b) by 59 days.

(21) Appl. No.: 17/543,344

(22) Filed: Dec. 6, 2021

(65) Prior Publication Data

US 2022/0177093 A1 Jun. 9, 2022

Related U.S. Application Data

(60) Provisional application No. 63/122,771, filed on Dec. 8, 2020.

(51) Int. Cl.
*B63H 1/12* (2006.01)
*B63H 21/12* (2006.01)
(Continued)

(52) U.S. Cl.
CPC ............... *B63H 1/12* (2013.01); *B63H 21/12* (2013.01); *G05D 1/0206* (2013.01); *B60F 3/0023* (2013.01); *G05D 2201/0207* (2013.01)

(58) Field of Classification Search
CPC .... B63H 1/12; B63H 21/12; B63H 2001/122; B63H 2001/125; B63H 2001/127;
(Continued)

(56) References Cited

U.S. PATENT DOCUMENTS 1,388,545 A * 8/1921 Bohan ..................... F42B 23/00
299/87.1
3,330,368 A * 7/1967 Baran ....................... H02G 1/06
254/134.6
(Continued)

FOREIGN PATENT DOCUMENTS

KR 10-2231281 B1 3/2021

OTHER PUBLICATIONS

International Searching Authority; Notification of International Search Report and Written Opinion; International Application No. PCT/US2022/028560; dated Aug. 23, 2022; 11 pages.

*Primary Examiner* — Andrew Polay
(74) *Attorney, Agent, or Firm* — The Marbury Law Group, PLLC

(57) ABSTRACT

Various aspects include a robot including a chassis, a rear section, and a forward propulsion auger. The chassis may include a forward section; a first drive motor positioned within the forward section; a rear section; and a maneuvering gimbal. The forward propulsion auger may be positioned on a leading end of the forward section and coupled to the first drive motor. The forward propulsion auger may include at least one fluid nozzle configured to eject a fluid therefrom for fluidizing at least a portion of a viscous mixture. The forward section and the rear section may be configured to be selectively pivoted relative to one another about the pivot axis of the maneuvering gimbal. Also, the forward propulsion auger may be configured to be rotated by the first drive motor relative to the forward section about a rotational axis normal to the pivot axis of the maneuvering gimbal.

20 Claims, 15 Drawing Sheets

(51) Int. Cl.
*G05D 1/02* (2020.01)
*B60F 3/00* (2006.01)

(58) Field of Classification Search
CPC .......... G05D 1/0206; G05D 2201/0207; B60F 3/0023; B62D 57/036
See application file for complete search history.

(56) References Cited

U.S. PATENT DOCUMENTS

| | | | |
|---|---|---|---|
| 3,800,889 A * | 4/1974 | Bauer | E02D 3/054 |
| | | | 175/19 |
| 4,232,903 A | 11/1980 | Welling et al. | |
| 4,338,043 A | 7/1982 | Biancale et al. | |
| 6,017,400 A | 1/2000 | Clark et al. | |
| 2004/0226747 A1 * | 11/2004 | Stegmaier | E21B 7/067 |
| | | | 175/73 |
| 2017/0292329 A1 * | 10/2017 | Hayik | E21B 7/26 |
| 2018/0119868 A1 | 5/2018 | Souvestre | |
| 2020/0338943 A1 * | 10/2020 | Tran | E21D 9/10 |

\* cited by examiner

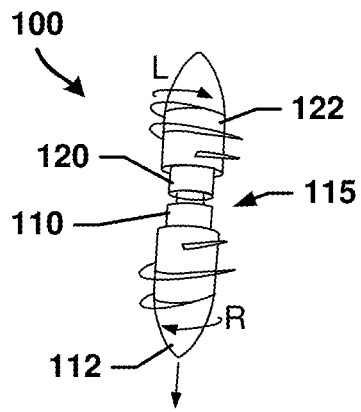
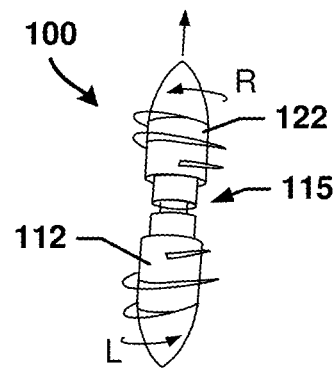
FIG. 3A  FIG. 3B
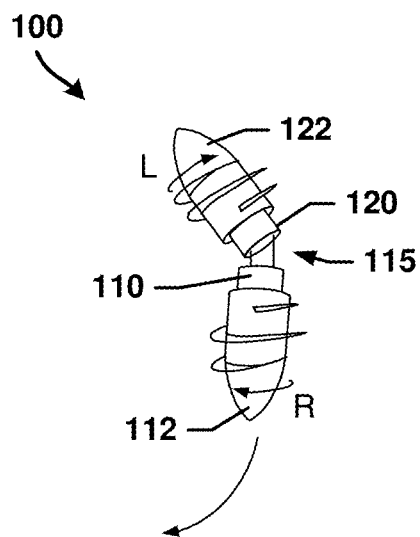
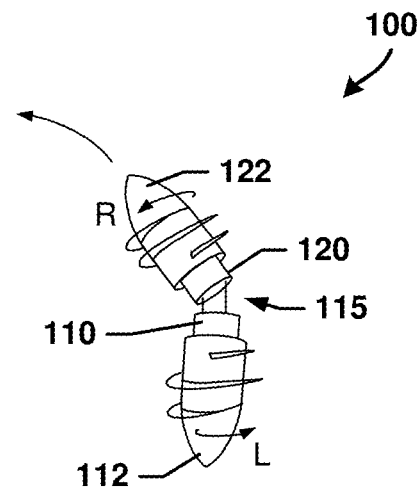
FIG. 3C  FIG. 3D

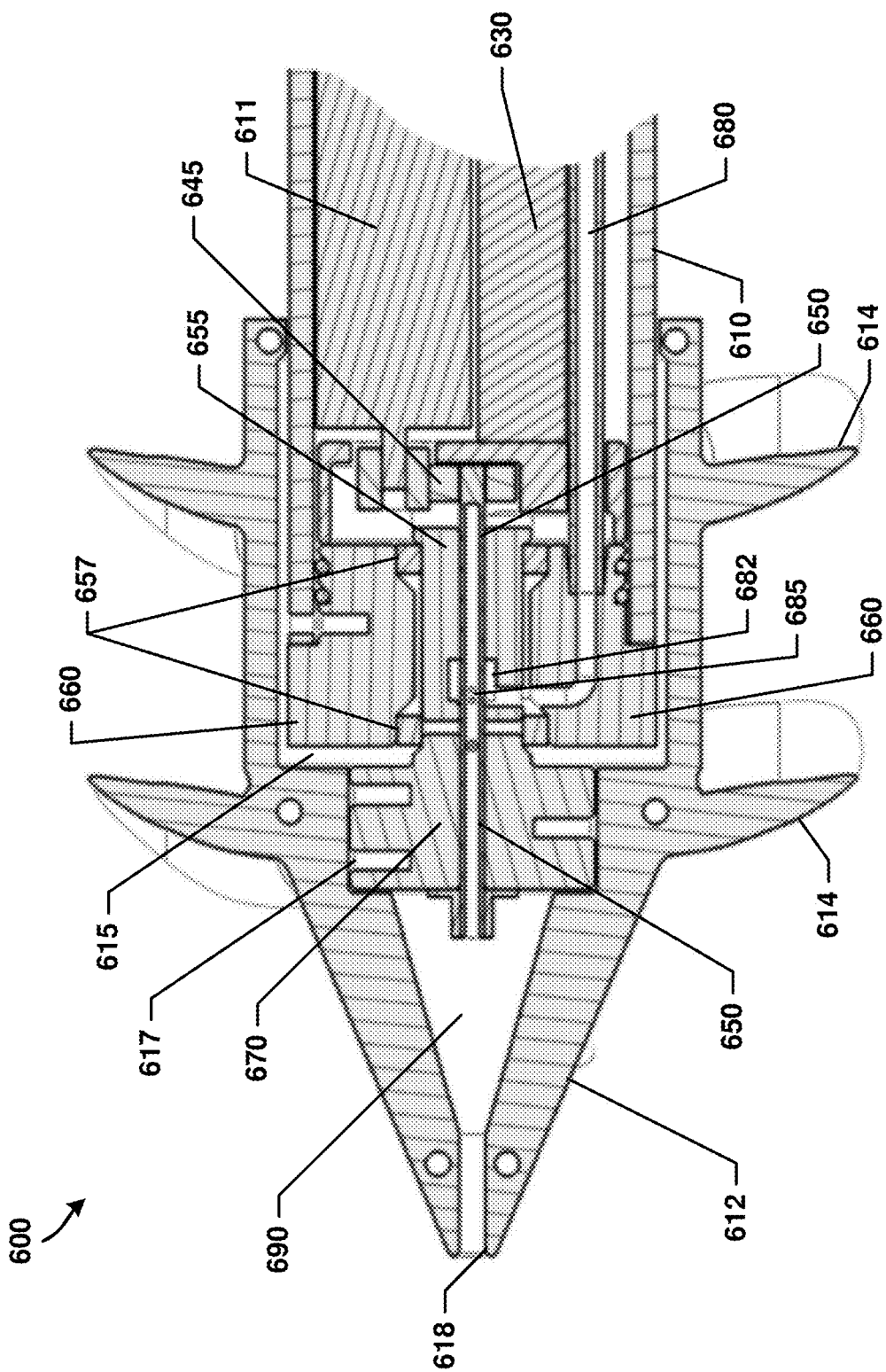

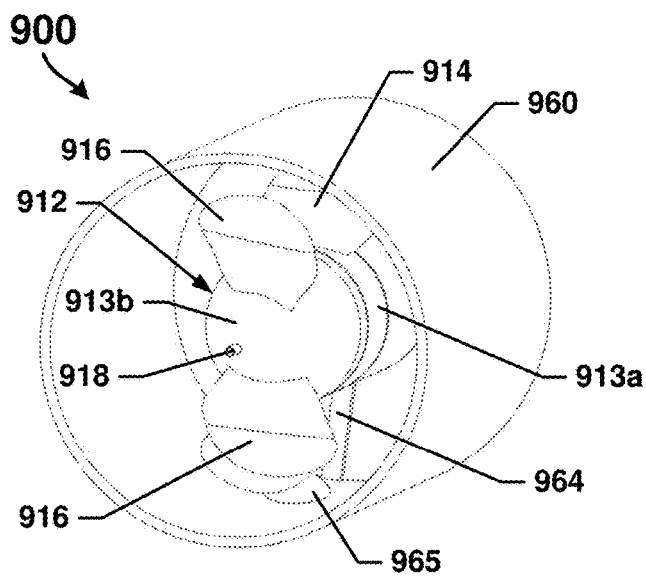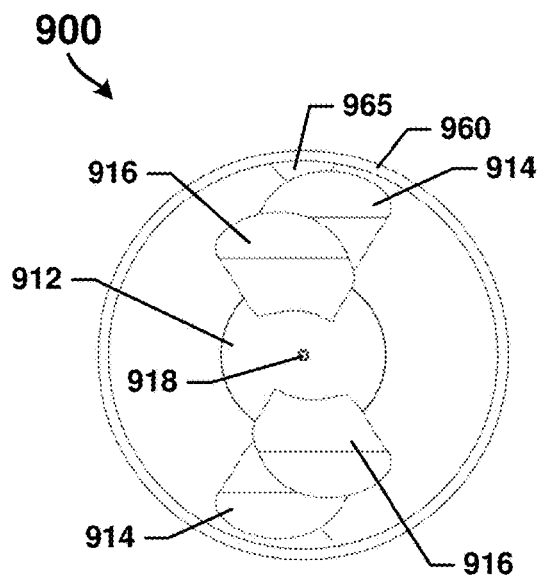
FIG. 9A  FIG. 9B
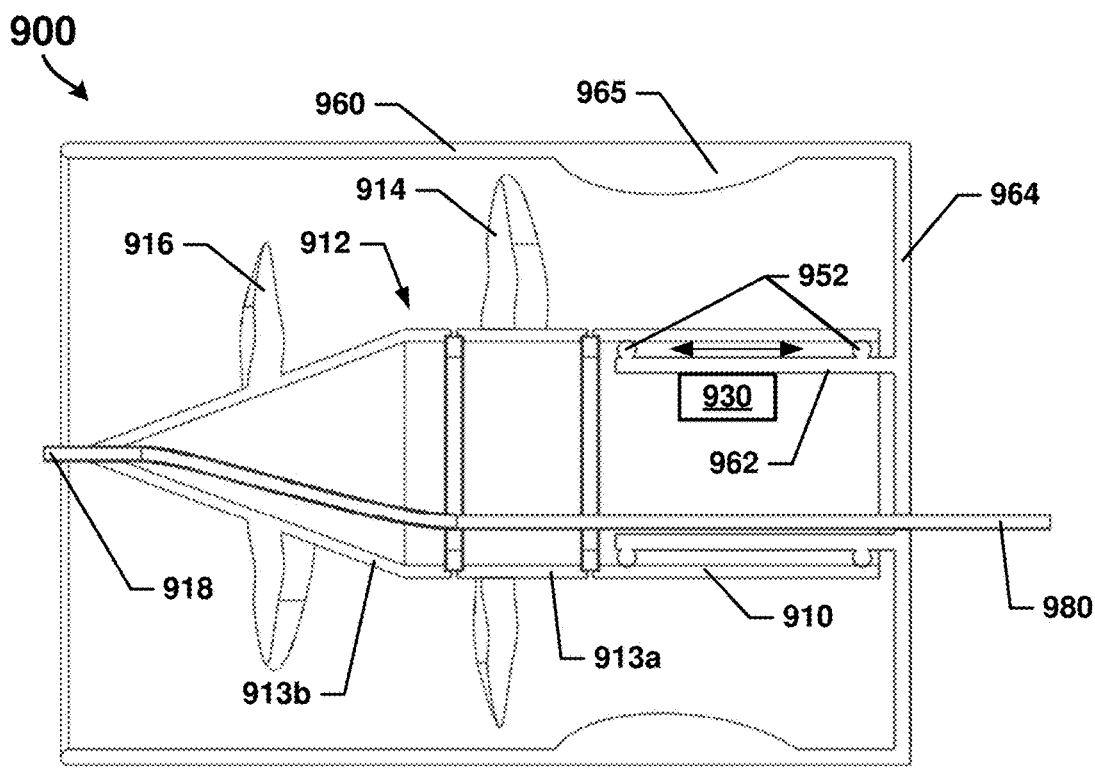
FIG. 9C

ROBOTIC SOLUTION TO PENETRATE AND MANEUVER THROUGH SLUDGE AND SEDIMENT

RELATED APPLICATIONS

This application claims the benefit of priority to U.S. Provisional Patent Application No. 63/122,771 entitled "Robotic Solution To Penetrate And Maneuver Through Sludge And Sediment," filed Dec. 8, 2020, the entire contents of which are hereby incorporated by reference for all purposes.

BACKGROUND

There are a number of applications for self-propelled robotic inspection devices capable of maneuvering in a variety of fluids for inspecting vessels, pipelines, ships, etc. However, robots operating in oil, sludge, sediment, sand, or other viscous mixtures have difficulty achieving movements through the medium and frequently get stuck. The challenges of self-propelled robots maneuvering in viscus fluids and mixtures limits the types of environments in which self-propelled robots may operate. For example, contemporary robots may be incapable of inspecting the inside of crude oil holding tanks or other types of tanks with thick or heavy sediment. This means that such tanks need to be drained for inspections, which adds to expense and delays required to perform periodic inspections. In addition, to remove fluids (e.g., oil) and sediment (i.e., the viscous mixtures) from tanks for inspection, chemicals are applied to clear out and/or loosen the sludge. Such chemicals may be harsh, expensive, and present environmental issues. A brute force approach of forcing a probe through the sludge if successful requires too much power to be practical.

SUMMARY

Various aspects include devices, systems, and methods for a robot to maneuver through viscous mixtures. The robot may include a chassis, a rear section, and a forward propulsion auger. The chassis may include a forward section; a first drive motor positioned within the forward section; a rear section; and a maneuvering gimbal. The forward propulsion auger may be positioned on a leading end of the forward section and coupled to the first drive motor. The forward propulsion auger may include at least one fluid nozzle configured to eject a fluid therefrom for fluidizing at least a portion of a viscous mixture adjacent to the forward propulsion auger. The forward section and the rear section may be configured to be selectively pivoted relative to one another about the pivot axis of the maneuvering gimbal. Also, the forward propulsion auger may be configured to be rotated by the first drive motor relative to the forward section about a rotational axis normal to the pivot axis of the maneuvering gimbal.

In some embodiments, the robot may also include a second drive motor and a rear propulsion auger. The second drive motor may be positioned within the rear section. The rear propulsion auger may be positioned on the rear section. The rear propulsion auger may be configured to be rotated by the second drive motor relative to the rear section about another rotational axis normal to the pivot axis of the maneuvering gimbal.

In some embodiments, the first drive motor, the second drive motor, the forward propulsion auger and the rear propulsion auger may be configured to rotate the forward and rear propulsion augers counter to one another. In some embodiments, the robot may also include a vibrator coupled to the chassis and configured to vibrate at least a portion of the robot. The vibrator may be configured to vibrate the chassis. The vibrator may be configured to vibrate the forward propulsion auger. The chassis may include an inner frame and an outer sleeve surrounding the inner frame. The vibrator may be configured to vibrate the outer sleeve relative to the inner frame. The vibrator may be mounted outside the chassis.

In some embodiments, the robot may include a fluid intake within the chassis and fluidly coupled to the at least one fluid nozzle. The fluid intake may be configured to be coupled to a fluid line for providing a primary fluid to the robot from a remote source of fluid. The robot may include a fluid pump within the chassis and configured to pump the fluid out through the at least one fluid nozzle. The robot may include one or more gimbal actuator arms in the maneuvering gimbal configured to pivot the forward section and the rear section about the pivot axis.

In some embodiments, the forward propulsion auger may include a first set of auger blades and a second set of auger blades. The first and second set of auger blades may be configured to counter-rotate relative to one another. The first set of auger blades may include two axially offset rows of auger blades configured to rotate in the same directions. At least some of the second set of auger blades may be disposed between the two axially offset rows of auger blades. The forward propulsion auger may include axially offset rows of auger blades, wherein at least one of the axially offset rows of auger blades includes multiple auger blades spaced apart from one another.

Various aspects include a method of maneuvering a robot through a viscous mixture disposed below a primary fluid that produced the viscous mixture. In the method, the robot may include a chassis supporting a forward section, a rear section, and a maneuvering gimbal coupled between the forward section and the rear section. The maneuvering gimbal may have a pivot axis configured to pivot the forward and rear sections relative to one another about the pivot axis. A forward propulsion auger may be positioned on a leading end of the forward section and coupled to a first drive motor. The forward propulsion auger may include at least one fluid nozzle configured to eject the primary fluid therefrom. The method may include placing the robot in or near the viscous mixture. Some of the primary fluid may be pumped through the at least one fluid nozzle in the forward propulsion auger thereby fluidizing a portion of the viscous mixture surrounding the robot. A drive motor configured to rotate the forward propulsion auger may be activated to propel the robot through the fluidized portion of the viscous mixture.

In some embodiments, the method may include activating the maneuvering gimbal to pivot the forward section relative to the rear section about the pivot axis to perform a turn maneuver. A second drive motor configured to rotate a rear propulsion auger positioned on the rear section may also be activated. The first and second drive motors may be configured to rotate the forward and rear propulsion augers counter to one another.

In some embodiments, activating the drive motor to rotate the forward propulsion auger may rotate a first set of auger blades and a second set of auger blades counter to one another.

The method may include activating a vibrator within the chassis to vibrate at least a portion of the robot. The method may include coupling the robot to a remote source of the primary fluid. In addition, the primary fluid may be conveyed to the robot while pumping the primary fluid through the at least one fluid nozzle in the forward propulsion auger.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

FIGS. 3A-3D are perspective views of various maneuvers performed by a robot in accordance with various embodiments.

FIG. 6B is a cross-sectional view of the forward portion of the robot from FIG. 6A, in accordance with various embodiments.

FIG. 9A is a perspective view of a propulsion auger with an outer sleeve configured to vibrate relative to the inner frame in accordance with various embodiments.

FIGS. 9B-9C are front and sides views of the propulsion auger with outer sleeve of FIG. 9A in accordance with various embodiments.

DETAILED DESCRIPTION

Figure 1:
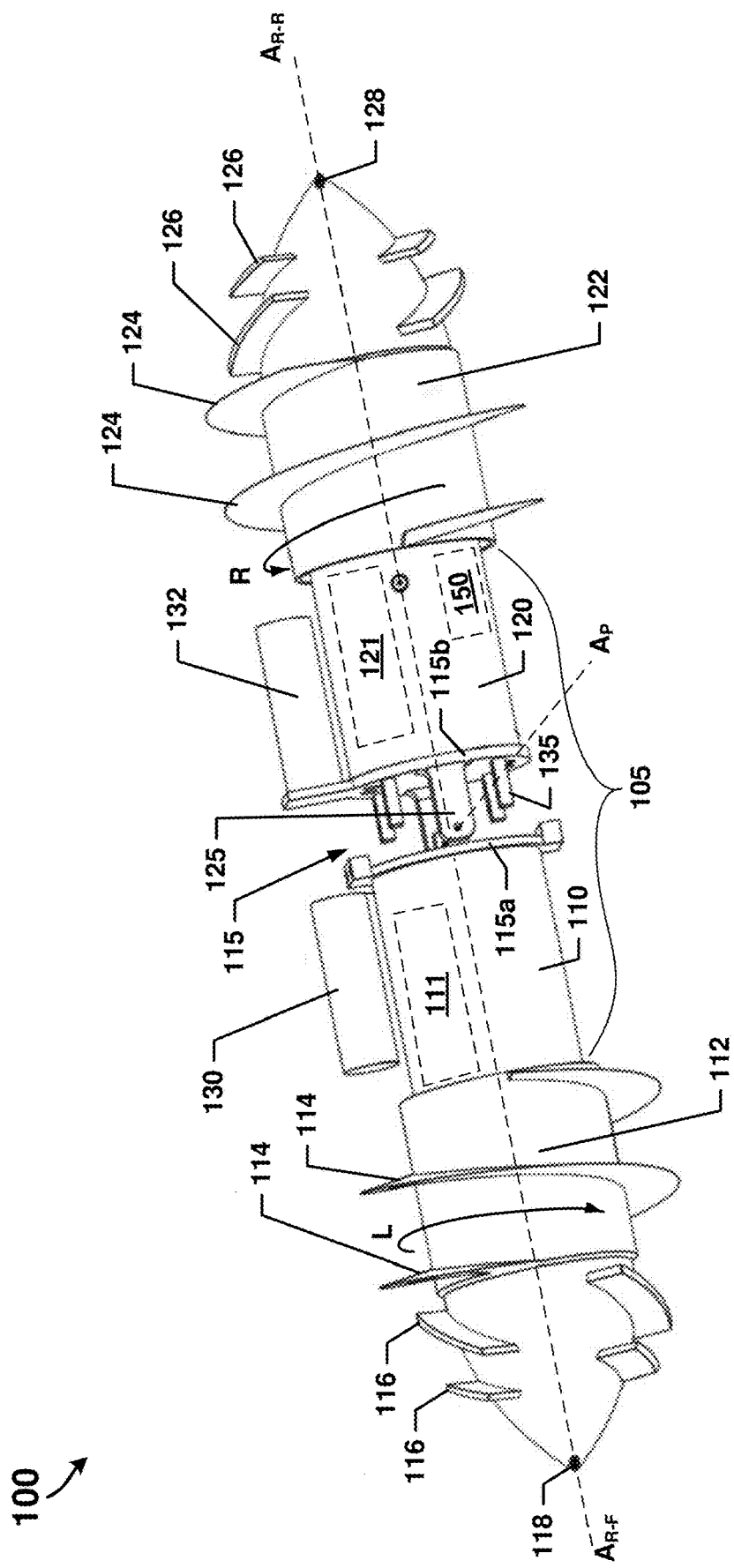
FIG. 1 is a partially exploded perspective view of a robot for maneuvering through viscous mixtures with counter rotational augers in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include a robot configured to maneuvering through a viscous mixture, which may penetrate and maneuver through sludge and sediment, such as the sediment in an oil tank. The robot may include a propulsion auger on a forward section of the robot, and in some embodiments a propulsion auger on a rear section of the robot. The forward and rear propulsion augers may be rotated by drive motors to propel the robot through the mixture. The robot may reduce the viscosity of the viscous mixture in a localized manner without external chemicals and with a low-energy solution by ejecting a primary fluid through one or more nozzles in one or both of the propulsion augers to locally reduce the viscosity of the mixture around the robot. Reducing viscosity locally may enable moving through and maneuvering in the viscous mixture, which facilitates inspections in environments such as crude oil tanks and the like without removing any material (i.e., the viscous mixture or the fluid associated with the viscous mixture). Various embodiments enable a robot to operate in viscous mixture environments for conducting inspections and/or analysis of the tank and/or the sediment. A technical advantage provided by various embodiments is that inspections may be performed of such tanks and/or sediment without having to remove the viscous mixture (e.g., the sediment).

Conventional robots for operating in viscus mixture conditions employ either brute force methods of forcing a robot through the viscous material without reducing the viscosity, which takes a lot of energy, or they inject chemicals to dissolve or modify the material in order to reduce viscosity. Generally, it is not possible to develop enough energy in a compact robot to force through a thick material, let alone maneuver therein.

Various embodiments may locally reduce the viscosity of a viscous mixture to enable a robot to move and maneuver through the viscous mixture. In particular, various embodiment may create a pocket of liquefaction around the robot or at least a leading end of the robot. Some embodiments may achieve the localized liquefaction through fluid injection to reduce viscosity. Some embodiments may achieve localized liquefaction through a combination of fluid injection and vibration of the viscous mixture near the robot, both of which reduce the viscosity in the area around the robot. These liquefaction techniques enable propulsion and maneuvering to happen in dense materials such as sludge, sediment and sand. Causing liquefaction of the viscous mixture, in accordance with various embodiments, may minimize or reduce the power required for a robot to maneuver through the viscous mixture without added or foreign chemicals. Once the viscosity of the viscous mixture is reduced, a robot using counter-rotating augers and a gimbaled directional maneuvering system may be activated to move through the material, taking advantage of the reduced viscosity around the robot.

Various embodiments include robots suitable for maneuvering through viscous mixtures including products of accumulated sediment or sludge from a primary fluid. Such viscous mixtures are generally composed of liquid and solid components or a semi-solid slurry, but have a much higher proportion of solid components and/or a higher viscosity than the primary fluid from which it originated. Solid components may originate as matter that was previously suspended in the primary fluid but settled to the bottom over time or as part of a refining process. As used herein, the terms "primary fluid" and "viscous mixture" are related in that the viscous mixture is a product of the primary fluid and/or originated from fluid that is the same as the fluid from which the viscous mixture originated. In various embodiments, the primary fluid may be drawn from above the viscous mixture (e.g., a higher level within a tank holding both the primary fluid and the viscous mixture) and pumped out of one or more nozzles in a propulsion auger. By using the primary fluid to reduce local viscosity, various embodiments avoid the need to use chemicals foreign to the primary fluid contained in the subject tank or different fluids that could contaminate the primary fluid.

A robot configured to maneuver through viscous mixtures in accordance with various embodiments may have various functionalities. One functionality includes the robot being configured to modify viscous mixtures, such as sediment, sand or other thick viscous materials in a localized way which facilitates easier motion in/through that area. To modify the viscous mixtures, various embodiments may use fluid injection and/or vibrations around the robot to create liquefaction of the viscous mixture in the immediate vicinity of the leading end of the robot. Another functionality includes the ability to drive motion in a fluidized region of the viscous mixture to achieve controlled maneuvering and propulsion. Various embodiments enable maneuvering and propulsion using one or more propulsion augers in combination with a maneuvering gimbal. By articulating the maneuvering gimbal and controlling the driving propulsion elements, a speed and/or direction of the robot may be controlled for maneuvering through the viscous mixture.

A robot, in accordance with various embodiments, may be used for inspections of fluid storage tanks holding viscous mixtures, such as the sediment at the bottom of tanks holding water, petroleum, or other similar liquids. Over time sludge, sediment, and/or other particulate materials build up at the bottom of fluid storage tanks, which prevents the tank from being inspected without removing the viscous mixture. A robot in accordance with various embodiments may be placed in a tank holding a viscous mixture. Once the robot reaches the viscous mixture in the tank (e.g., at the bottom), the robot may be configured to generate liquefaction and propulsion, which may enable the robot to inspect the tank. In this way, the robot may be configured to deliver a sensor to regions of the tank otherwise buried under the viscous mixture, which sensor may be used to inspect the tank for corrosion, rust, or other material defects. The robot of various embodiments may negate the need to empty and/or clean the tank, which may require taking the tank offline for inspection. Additionally, the robot of various embodiments may also be used for inspection of other liquid holding or carrying vessels, such as pipelines, which may have similar issues with clogs and sediment. Thus, the robot of various embodiments may be used to move and maneuver through complex viscous environments.

FIG. 1 illustrates a robot 100 for maneuvering through viscous mixtures in accordance with various embodiments. The robot 100 includes a chassis 105. The chassis 105 may include forward and rear chassis sections 110, 120 coupled to one another by a maneuvering gimbal 115 configured to be selectively pivoted relative to one another about a pivot axis $A_P$ of the maneuvering gimbal 115. A first drive motor 111 may be incorporated in the forward section 110 and configured to drive (i.e., rotate) a forward propulsion auger 112. The maneuvering gimbal 115 provides a pivoted support, controlled by one or more actuators that control the pivotal rotation of the forward and rear sections 110, 120 relative to one another. By controlling the pivotal relationship of the forward and rear chassis sections 110, 120 when the forward propulsion auger 112 generates propulsion, the maneuvering gimbal 115 may control pitch and yaw attitudes of the robot 100, enabling the robot to maneuver through viscous mixtures.

FIG. 1 shows the chassis 105 partially exploded, with the forward and rear chassis sections 110, 120, as well as forward and rear gimbal sections 115a, 115b of the maneuvering gimbal 115, separated from one another for ease of display. The forward chassis section 110 is fixedly secured to the forward gimbal section 115a. Similarly, the rear chassis section 120 is fixedly secured to the rear gimbal section 115b. Also, the forward and rear gimbal sections 115a, 115b of the maneuvering gimbal 115 may be couple to one another through pivotal supports 125 and actuator arms 135. A gimbal actuator may move select ones of the actuator arms 135 linearly, causing the forward and rear gimbal sections 115a, 115b to move relative to one another. The pivotal supports 125 restrict the relative movement of the forward and rear gimbal sections 115a, 115b to pivotal movement relative to one another about a pivot axis $A_P$. The actuator arms 135 may guide and/or control the relative movement between the forward and rear gimbal sections 115a, 115b. Once the forward and rear gimbal sections 115a, 115b are pivotally secured, the forward and rear chassis sections 110, 120 attached thereto, respectively, are pivotally secured relative to one another. Pivoting the forward and rear sections 110, 120 relative to one another may provide directional steering control for movement of the robot 100 through the viscous mixture in response to the propulsion by at least the forward propulsion auger 112. In this way, the maneuvering gimbal 115 may provide a gimbaled directional maneuvering system.

The forward propulsion auger 112 may be rotationally mounted on a leading end of the chassis 105 (i.e., the left side of FIG. 1 in the configuration shown). A forward rotational axis $A_{R-F}$ of the forward propulsion auger 112 is normal to the pivot axis $A_P$ of the maneuvering gimbal 115. The forward propulsion auger 112 is configured to be selectively driven by the first drive motor 111 to rotate relative to the chassis 105 for propulsion of the robot 100 through the viscous mixture. The first drive motor 111 may be an electric motor (e.g., alternating current (AC) motor, brushed direct current (DC) motor, brushless DC motor, geared DC motor, servo motor, stepper motor, or linear motor), a pneumatic motor, hydraulic motor, internal combustion motor (i.e., engine), chemical motor, or other device that converts energy into motion.

The forward propulsion auger 112 may include at least one forward fluid nozzle 118 configured to eject a fluid therethrough for fluidizing a portion of the viscous mixture adjacent to the forward propulsion auger 112. In some embodiments, the at least one forward fluid nozzle 118 may be configured to eject fluid that is the same as a primary fluid from which the viscous mixture originated or of which the viscous mixture is a product. Fluid ejected from the at least one forward fluid nozzle 118 may help fluidize the viscous mixture directly in front of and surrounding the forward propulsion auger 112. The amount of fluid needed to fluidize the viscous mixture may depend on how much fluid is already in the viscous mixture, the viscosity of the ejected fluid, and the density of the viscous mixture being penetrated.

The fluid ejected from the at least one forward fluid nozzle 118 may be collected from a remote region of the tank, such as at a higher elevation in the tank above the level at which the viscous mixture (e.g., sediment) has collected. The robot 100 may include a fluid pump 150 for drawing-in and ejecting the fluid from the at least one forward fluid nozzle 118. In some embodiments, the fluid pump 150 may be an onboard fluid pump supported by the chassis 105 and configured cause fluid to eject from the at least one fluid nozzle 118. The onboard fluid pump 150 may be internal or optionally external to the chassis 105. Alternatively, the fluid pump may be a remote fluid pump configured to pump fluid to the robot 100, which may in turn be ejected from the at least one forward fluid nozzle 118. In some embodiments, the robot 100 may include an internal holding chamber for holding or at least staging the fluid for ejection from the at least one forward fluid nozzle 118. In some embodiments, such an internal chamber may be continuously replenished with fluid from a remote reservoir via a hose or pipe.

The forward propulsion auger 112 may also include one or more sets of auger blades 114, 116 that projecting outwardly in a radial direction from the central mounting point of the forward propulsion auger 112. The one or more sets of auger blades 114, 116, when rotated relative to the chassis 105 may produce a propulsion force for the robot 100. In this way, rotation of the one or more sets of auger blades 114, 116 in a first rotational direction L will the move the robot 100 forward, while a second rotational direction, opposite the first, will move the robot 100 in an opposite direction.

In some embodiments, a first set of auger blades 114, may be formed as one continuous helical twist that wraps around a cylindrical base portion of the central mounting point. In some embodiments, a second set of auger blades 116, on the forward tip of the bullet-shaped head, may be formed as a plurality of separate blade sections, each having a non-zero angle of attack relative to the intended direction of motion. In some embodiments, the first set of auger blades 114 may be formed as a plurality of separate blade sections and/or the second set of auger blades 116 that are formed together as one continuous helical twist that wraps around the cylindrical base portion of the central mounting point. In some embodiments, the bullet-shaped head may have only one continuous helical twisting auger blade, rather than two or more separate sets of auger blades.

Some embodiments may also take advantage of gravity, which may pull the robot toward the bottom of the tank, in combination with liquefaction techniques described herein. In some embodiments that use gravity to pull the robot, the propulsion auger blades may not be necessary or may not need to be very big. While having smaller or no propulsion auger blades may provide less maneuvering control for the robot, the vibration and fluid ejection techniques described herein may be enough for the robot be enough through the viscous mixture.

In some embodiments, the robot 100 may include a rear propulsion auger 122 mounted on a rear section 120 of the chassis 105 (i.e., the left side of FIG. 1 in the configuration shown). The rear propulsion auger 122 may be selectively driven by a second drive motor 121 to rotate relative to the chassis 105. The second drive motor 112 may be positioned within the rear section 120. The second drive motor 112 may be similar to the first drive motor 111 described above. Like the forward rotational axis $A_{R-F}$, a rear rotational axis $A_{R-R}$ of the rear propulsion auger 122 is normal to the pivot axis $A_P$ of the maneuvering gimbal 115. However, due to the pivoting relationship between the forward and rear sections 110, 120 of the chassis 105, the forward rotational axis $A_{R-F}$ and the rear rotational axis $A_{R-R}$ also pivot relative to one another. Alternatively, the robot 100 may include only a rear propulsion auger 122 and not a forward propulsion auger.

Like the forward propulsion auger 112, the rear propulsion auger 122 may also include one or more sets of rear auger blades 124, 126 that projecting outwardly in a radial direction from a bullet-shaped head of the rear propulsion auger 122. The one or more sets of rear auger blades 124, 126, when rotated relative to the chassis 105 may produce a propulsion force for the robot 100. In this way, rotation of the one or more sets of rear auger blades 124, 126 in a second rotational direction R will the move the robot 100 forward, while a first rotational direction, opposite the second, will move the robot 100 in an opposite direction.

The rear propulsion auger 122 may include at least one rear fluid port 128 configured to receive fluid for ejection from the at least one forward fluid nozzle 118. A fluid intake line (e.g., 410 in FIG. 4) may be coupled to the at least one rear fluid port 128. Alternatively, a fluid intake line may be coupled to the chassis 105 such that fluid may be directed to either the at least one forward fluid nozzle 118 or the rear fluid port 128, depending on the maneuvering direction (i.e., forward or backward) of the robot 100.

The forward and rear propulsion augers 112, 122 may be configured to rotate in opposite directions to one another (i.e., counter-rotating augers), which reduces or eliminates rotation by the chassis 105 when the forward and rear propulsion augers 112, 122 rotate, which moves the robot 100 through the viscous mixtures. In this way, the counter rotation of the forward and rear propulsion augers 112, 122 will propel the robot 100 through a maneuver. In addition, the rotational speed of each of the propulsion augers 112, 122 may be controlled independently. Using different speeds for the forward and rear propulsion augers 112, 122 may induce a roll maneuver. The robot 100 will tend to roll opposite the rotational direction of the faster propulsion auger (e.g., 112, 122). For example, if the forward propulsion auger 112 is spinning faster than the rear propulsion auger 112 and the forward propulsion auger 112 is spinning clockwise, the robot 100 may be induced to roll in a counter-clockwise direction.

Optionally, one or both of the forward and rear sections 110, 120 of the chassis 105 may include one or more protruding fins that may serve as anti-rotational stabilizers.

In some embodiments, the robot may include vibrators (i.e., vibration engines), which may assist in loosening up or promoting liquefaction of the viscous mixture around the robot to further enable the robot 100 to maneuver through the viscous mixture. The vibrators may work in combination with the fluid (e.g., primary fluid) ejected from the at least one forward fluid nozzle 118 to promote liquefaction of the viscous mixture. The vibrators may be located in or on select portions of the robot 100. Alternatively, the vibrators may be surrounding the entire robot 100. The vibrator may also be integrated directly into the robot 100 or as a floating attachment to operates on the periphery of the robot 100.

As shown in FIG. 1, the forward and rear sections 110, 120 of the chassis 105 may include external vibrators 130, 132, respectively. The external vibrators 130, 132 may vibrate in-synch or out of synch with one another. Also, in addition to the vibrators 130, 132 themselves vibrating, the vibrators may be configured to vibrate the chassis 105, at least an external shell thereof, and/or the forward and/or rear propulsion augers 112, 120. The vibrations generated by the vibrators 130, 132 may either be linear or rotational. The vibrators 130, 132 may be electric powered, pneumatic, hydraulic, and/or generate vibrations by other means. The amplitude and frequency of the generated vibrations may be designed/adjusted to facilitate a viscosity change in the surrounding viscous mixture. The robot 100 should have enough fluid in the region immediately adjacent to it for the vibrations from the vibrators 130, 132 to be able to create a liquefaction event.

Depending on the viscous material through which the robot 100 needs to penetrate, one or both of the fluid ejection or vibration techniques may be included and/or employed by the robot 100. The heavier, more viscous mixtures (e.g., sand) may require a combination of fluid ejection and vibration for the robot to maneuver there through.

Figure 2A:
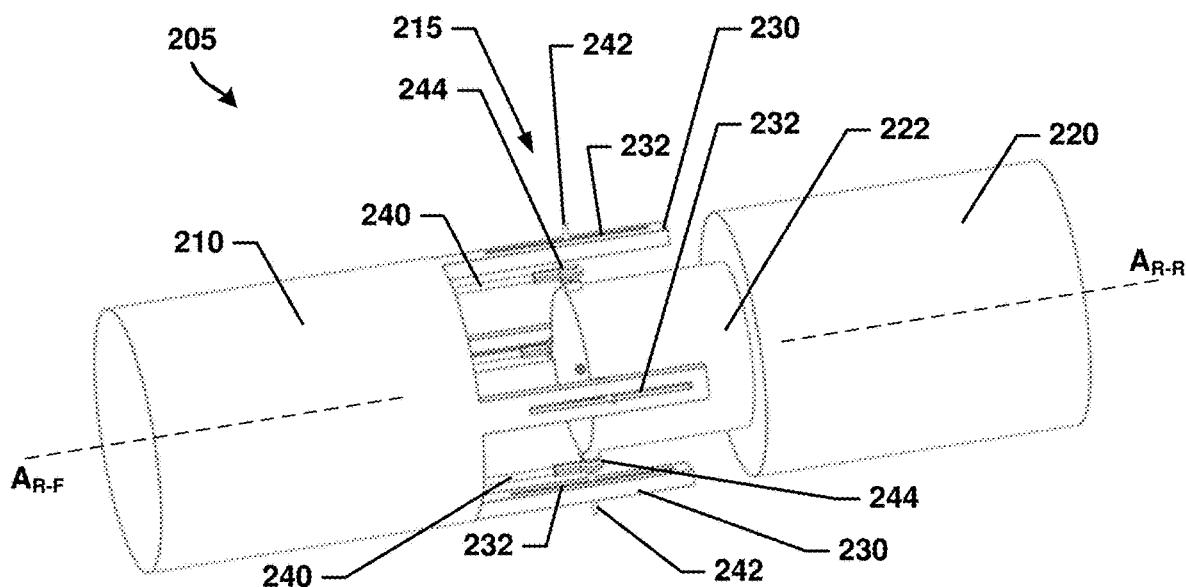
FIG. 2A is a perspective view of a chassis, in isolation without augers, in a linear configuration in accordance with various embodiments.
Figure 2B:
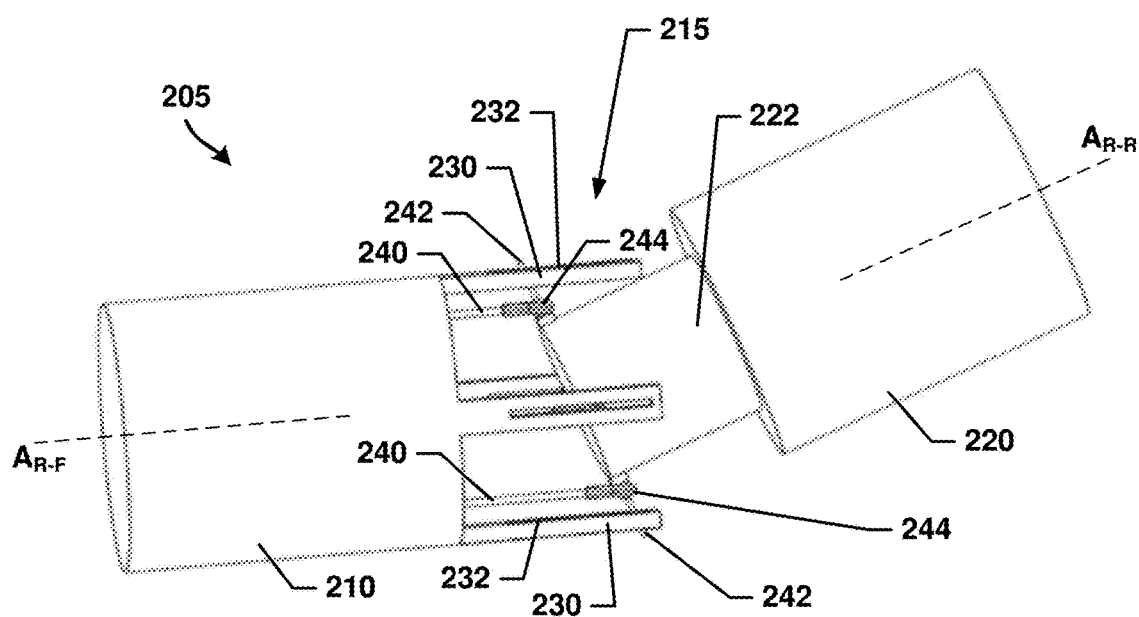
FIG. 2B is a perspective view of the chassis from FIG. 2A, in a non-linear configuration in accordance with various embodiments.

FIGS. 2A and 2B show a chassis 205 with an alternative maneuvering gimbal 215, in isolation without propulsion augers. In the orientation shown in FIGS. 2A and 2B, the left side is referred to as the forward end and the left side is referred to as the rear end. The chassis 205 includes forward and rear chassis sections 210, 220 with a maneuvering gimbal 215 there between. The forward and rear chassis sections 210, 220 may each have a cylindrical form. The maneuvering gimbal 215 may include various components, such as guide bars 230, push rods 240, and anti-rotation pins 242 that together couple and control the pivotal movement of the forward and rear chassis sections 210, 220. The maneuvering gimbal 215 is illustrated as including four sets of guide bars 230, push rods 240, and anti-rotation pins 242, in accordance with some embodiments. Some embodiments may include a greater or fewer number of sets of guide bars 230, push rods 240, and anti-rotation pins 242.

A cylindrical forward end 222 of the rear chassis section 220 may have a smaller outer diameter than the rest of the rear chassis section 220. The narrower cylindrical forward end 222 is configured to fit between the guide bars 230, which are fixed to and extend from a rear end of the forward chassis section 210 toward the rear chassis section 220. Each of the guide bars 230 may include a guide slot 232 configured to receive one anti-rotation pin 242. Each anti-rotation pin 242 may be coupled to and extend from the cylindrical forward end 222 of the rear chassis section 220. Also, each of the anti-rotation pins 242 may extend radially away from the rear rotational axis $A_{R-R}$ and passes through a respective guide slot 232. In this way, the anti-rotation pins 242 may be configured to slide within a longitudinal extend of their respective guide slots 232 when the forward and rear chassis sections 210, 220 move relative to one another.

The push rods 240 (i.e., actuator arms) may extend from the rear end of the forward chassis section 210 toward the rear chassis section 220 and are spaced apart at either 90-degree intervals or 120-degree intervals, similar to the guide bars 230 and the anti-rotation pins 242. The push rods 240 may be separately controlled by actuator motors configured to extend and retract individual push rods 240 from the forward chassis section 210 relative to the rear chassis section 220. In this way, each push rod 240 may be extended or contracted to a different extent than the other push rods 240. Also, each push rod 240 v coupled to a separate one of the anti-rotation pins 242 through a ball joint 244 at the base of each of the anti-rotation pins 242. The push rods 240 may guide and/or control the relative movement between the forward and rear chassis sections 210, 220. Such relative movement between the forward and rear chassis sections 210, 220 may include pivotal movement there between. Pivoting the forward and rear chassis sections 210, 220 relative to one another may provide directional steering control for movement of the robot (e.g., 100) through the viscous mixture. In this way, the maneuvering gimbal 215 may provide a gimbaled directional maneuvering system.

FIG. 2A shows the chassis 205 in a linear configuration with the forward rotational axis $A_{R-F}$ parallel to the rear rotational axis $A_{R-R}$, in accordance with some embodiments.

In contrast, FIG. 2B shows the chassis 205 in a non-linear configuration with the forward rotational axis $A_{R-F}$ no longer parallel to the rear rotational axis $A_{R-R}$, in accordance with various embodiments. The actuator motors that control the push rods 240 may extend at least one of the push rods 240 further away from the forward chassis section 210 than other push rods 240, which causes pivotal movement of the forward and rear chassis sections 210, 220 relative to one another.

FIGS. 3A-3D illustrate the robot 100 performing maneuvers in accordance with various embodiments. In FIGS. 3A-3D the first and second rotational directions R, L are relative to the forward and rear chassis sections 110, 120 and the maneuvering gimbal 115.

In FIG. 3A, the robot 100 is moving straight forward, which is downward in the orientation shown. To perform a forward movement maneuver, the robot 100 maintains the forward rotational axis (i.e., $A_{R-F}$) parallel to the rear rotational axis (i.e., $A_{R-R}$), while rotating the forward propulsion auger 112 in the first rotational direction R and the rear propulsion auger 122 in the second rotational direction L.

In FIG. 3B, the robot 100 is moving straight backward, which is upward in the orientation shown. To perform a backward movement maneuver, the robot 100 maintains the forward rotational axis (i.e., $A_{R-F}$) parallel to the rear rotational axis (i.e., $A_{R-R}$), while rotating the forward propulsion auger 112 in the second rotational direction L and the rear propulsion auger 122 in the first rotational direction R.

In FIG. 3C, the robot 100 is advancing while turning, which is downward and turning left in the orientation shown. To perform an advancing turn maneuver, the maneuvering gimbal 115 pivots the forward chassis section 110 relative to the rear chassis section 120, while rotating the forward propulsion auger 112 in the first rotational direction R and the rear propulsion auger 122 in the second rotational direction L.

In FIG. 3D, the robot 100 is retreating while turning, which is upward and turning left in the orientation shown. To perform a retreating turn maneuver, the maneuvering gimbal 115 pivots the forward chassis section 110 relative to the rear chassis section 120, while rotating the forward propulsion auger 112 in the second rotational direction L and the rear propulsion auger 122 in the first rotational direction R.

Figure 4:
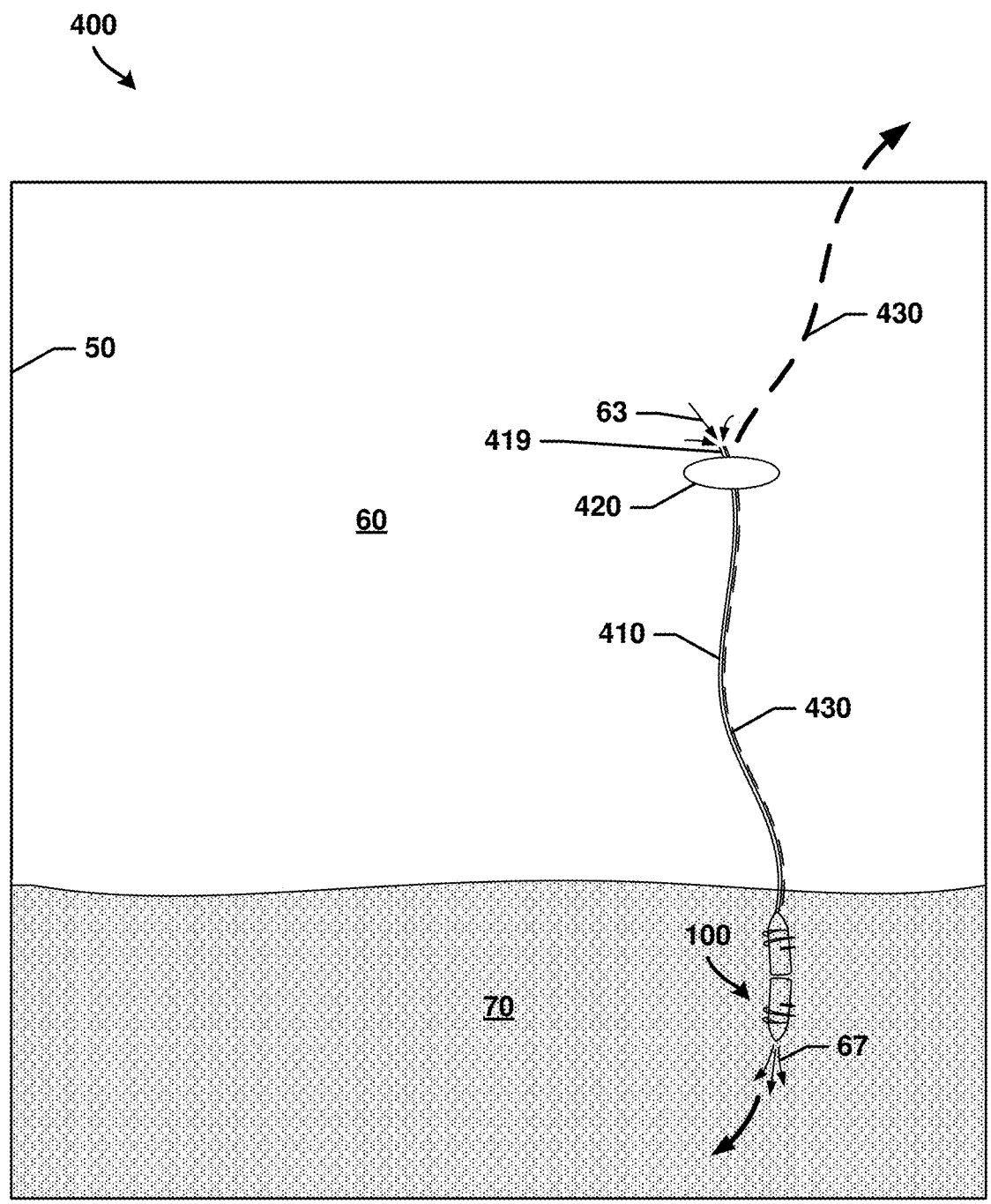
FIG. 4 is a schematic view of a robot maneuvering in a working environment in accordance with various embodiments.

FIG. 4 shows the robot 100 maneuvering in a working environment 400 in accordance with various embodiments. In FIG. 4, the robot 100 is shown submerged in a tank 50 (i.e., a holding vessel), which contains a primary fluid 60 and a viscous mixture 70 in the form of thick sediment layers at the bottom if the tank 50. The robot 100 is shown submerged within the viscous mixture 70 and maneuvering towards the bottom of the tank 50.

In some embodiments, the robot 100 may include a fluid intake line 410, in the form of a collection hose, tether line, or pipe, that extends from the robot 100 (e.g., connected to the at least one rear fluid port 128) beyond the viscous mixture 70, and into the primary fluid 60 associated with the viscous mixture 70, which is also inside the tank 50. The fluid intake line 410 may be used to draw-in (i.e., such as through suction) some of the primary fluid 60. Drawn-in fluid 63 collected at the remote end 419 of the fluid intake line 410 may be made to pass into and through the chassis (e.g., 105) of the robot 100 for ejection from the at least one forward fluid nozzle (e.g., 118) in a direction forward and/or around the forward end of the robot 100. The ejected fluid 67, from the at least one forward fluid nozzle 118, may be configured to fluidize or help fluidize the viscous mixture 70 ahead of the robot 100.

In some embodiments, the fluid intake line 410 may be connected to a float 420 that will ensure the remote end 419 remains in the uppermost levels of the tank 50. The float 420 may be a buoyancy device or otherwise a tether (e.g., a cable attached to the top of the tank 50) that ensures the remote end 419 remain surrounded by the primary fluid 60 and does not get bogged down in the viscous mixture 70. Alternatively, the fluid intake line 410 may be formed from lightweight tubing, which may have a natural tendency to float and thus remain in the upper layers of the tank where the primary fluid 60 may be collected.

In some embodiments, the robot 100 may include a fluid pump configured to create the negative pressure necessary to suction the drawn-in fluid 63 and expel the ejected fluid 67. Alternatively, the fluid pump may be located in the float 420 or even outside the tank 50. A fluid pump located outside the tank may require the fluid intake line 410 to extend from the robot 100 to the fluid pump outside the tank, and back into the upper layers of the tank for collection of the primary fluid 60.

The robot 100 may optionally include a power line 430, which may extend from the chassis (e.g., 105) of the robot 100 to a power source outside the tank 430. Optionally, the power line 430 may pass through the float 420 to power sensors or other components therein, such as a fluid pump.

Figure 5:
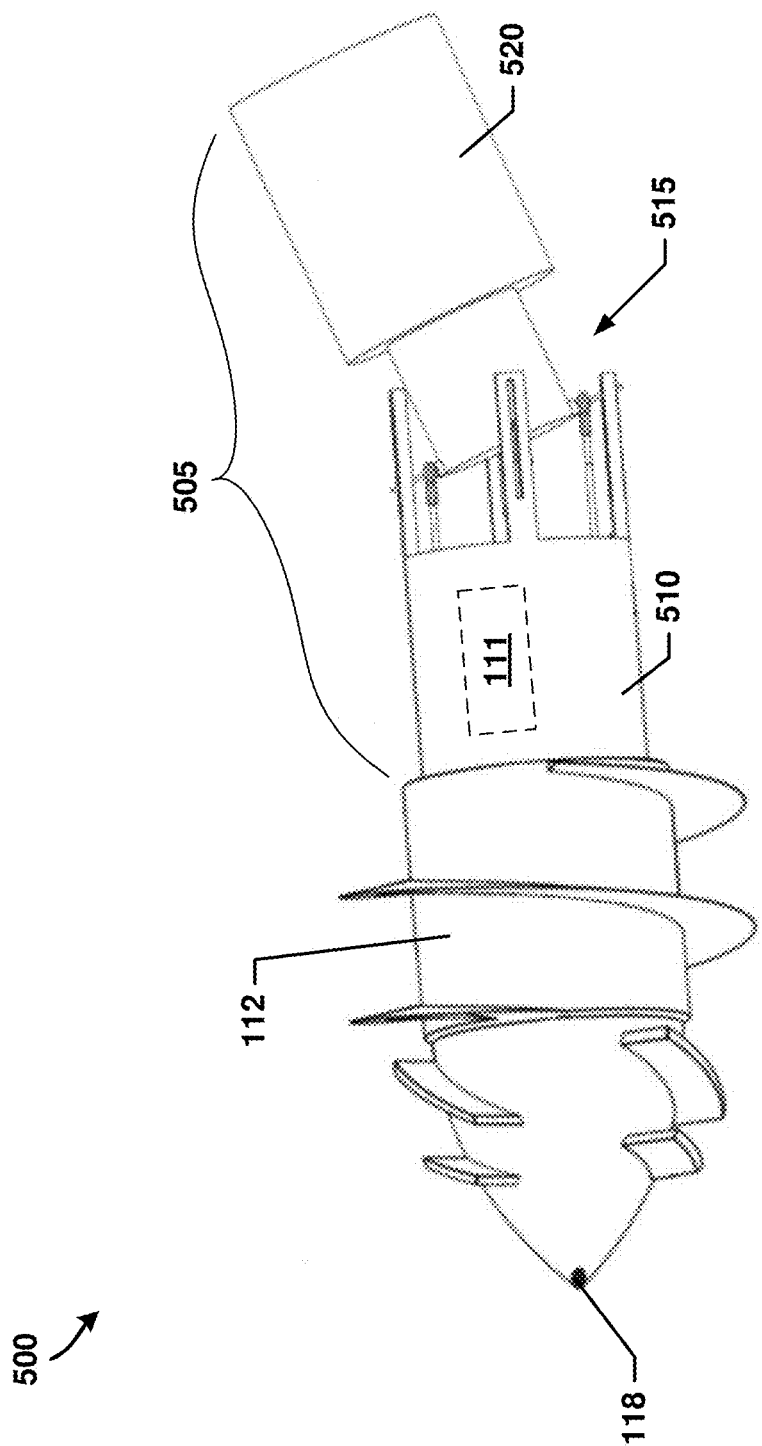
FIG. 5 is a perspective view of a robot for maneuvering through viscous mixtures without a rear propulsion auger in accordance with various embodiments.

FIG. 5 illustrates a robot 500 for maneuvering through viscous mixtures in accordance with various embodiments. The robot 500 includes a chassis 505 with forward and rear chassis sections 510, 520 coupled to one another and configured to be selectively pivoted relative to one another about a pivot axis $A_P$ of a maneuvering gimbal 515 disposed between the forward and rear sections 510, 520. However, contrary to the robot 100 described above with regard to FIGS. 1-4, the robot 500 does not include a rear propulsion auger. The maneuvering gimbal 515 may provide a pivoted support, controlled by one or more actuators that control the pivotal rotation of the forward and rear chassis sections 510, 520 relative to one another. By controlling the pivotal relationship of the forward and rear chassis sections 510, 520 when the forward propulsion auger 112 generates propulsion, the maneuvering gimbal 515 may also control pitch and yaw attitudes of the robot 500 as it maneuvers. Without a rear propulsion auger, the robot 500 may provide less maneuverability, but may still have application in linear investigation environments, such as in a pipe.

Figure 6A:
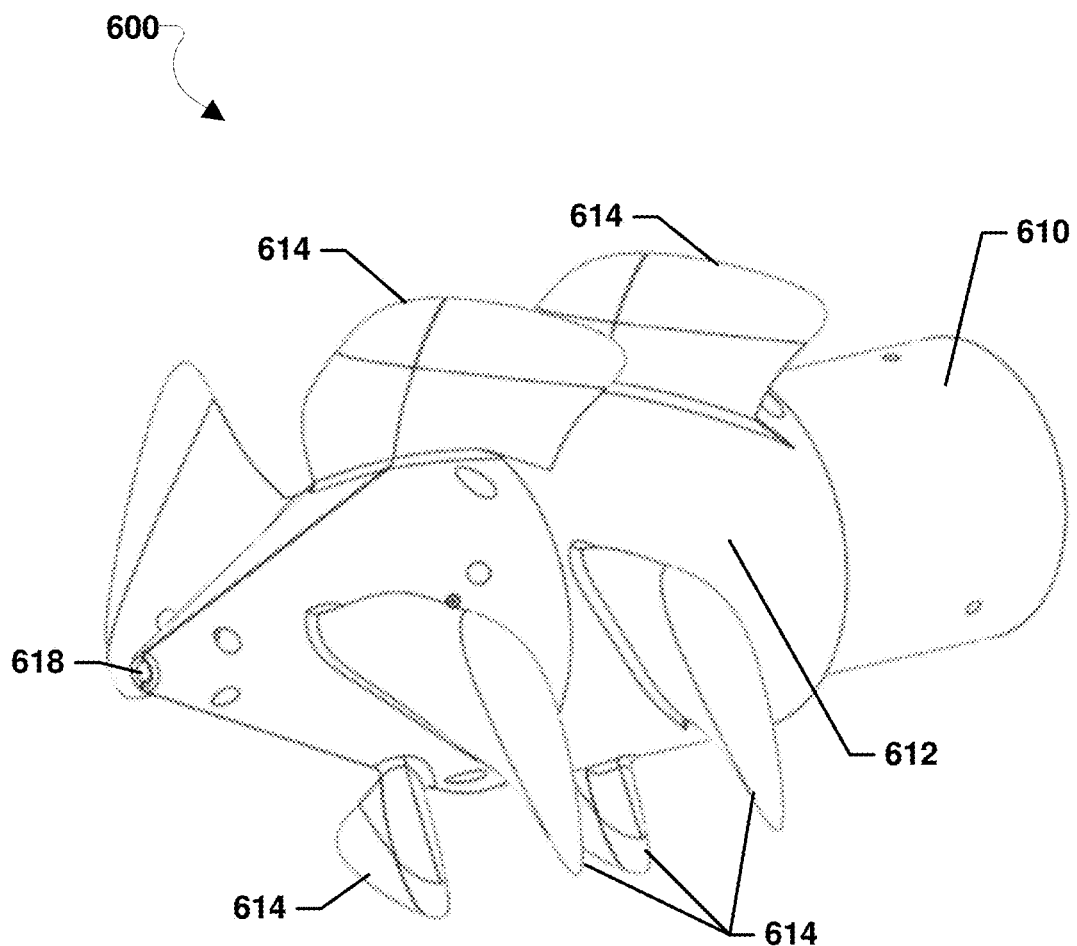
FIG. 6A is a perspective view of a forward portion of a robot in accordance with various embodiments.

FIGS. 6A and 6B show isolation views of a forward portion of a robot 600 in accordance with various embodiments. In particular, the robot 600 includes a forward chassis section 610 and an alternative forward propulsion auger 612. The alternative forward propulsion auger 612 may be substantially similar to the forward and/or rear propulsion augers 112, 122 described with regard to FIG. 1, but with different sets of auger blades 614. As shown, the auger blades 614 may consist of two axially spaced rows with four separate blades in each row.

FIG. 6B is a cross-sectional view of the forward portion of the robot 600 shown in FIG. 6A. As shown, the alternative forward propulsion auger 612 includes a first receiving chamber 615 configured to receive the forward chassis section 610 therein. In addition, the alternative forward propulsion auger 612 may include a second receiving chamber 617 configured to receive an auger hub 670 that may transfer rotation to the alternative forward propulsion auger 612.

The forward chassis section 610 may house various components, such as an internal vibrator 630 that is configured to directly cause vibration of the chassis 610. In addition, the forward chassis section 610 may house a drive motor 611 that is configured to move drive gears 645 that are coupled to a hollow drive shaft 650. The hollow drive shaft 650 may transfer rotation to a drive hub 655 configured to rotate within a chassis mount 660 and sealed therein by sealed bearings 657. The chassis mount 660 may be fixedly secured to the forward chassis section 610, which may be formed as a cylindrical structure for housing components therein. The hollow drive shaft 650 may also transfer rotation to an auger hub 670 located outside a forward end of the chassis mount 660. The auger hub 660 may be coupled to the alternative forward propulsion auger 612, such that rotation of the hollow drive shaft 650 and the auger hub 670 rotates the alternative forward propulsion auger 612.

An internal fluid intake line 680 is configured to receive fluid from the at least one rear fluid port (e.g., 128 in FIG. 1) and/or the external fluid intake line (e.g., 410 in FIG. 4). An onboard and/or remote fluid pump may supply the pressure that causes (i.e., encourages) some of the primary fluid (e.g., 60 in FIG. 4) into the internal fluid intake line 680 and toward the forward fluid nozzle 618. Some primary fluid may thus be directed from the internal fluid intake line 680 to the inside of the hollow drive shaft 650, via fluid holes 685. The fluid holes 685 may be aligned with a relatively small inner fluid chamber 682 that surrounds the hollow drive shaft 650 in the vicinity of the fluid holes 685. From the hollow drive shaft 650, the primary fluid may flow into the outer fluid chamber 690 before being ejected from the forward fluid nozzle 618. The outer fluid chamber 690 may be a cavity formed between an inside of the alternative forward propulsion auger 612 and the forward chassis section 610. Primary fluid ejected from the forward fluid nozzle 618 may help fluidize the viscous mixture directly in front of, adjacent, and/or surrounding the alternative forward propulsion auger 612.

Figure 7:
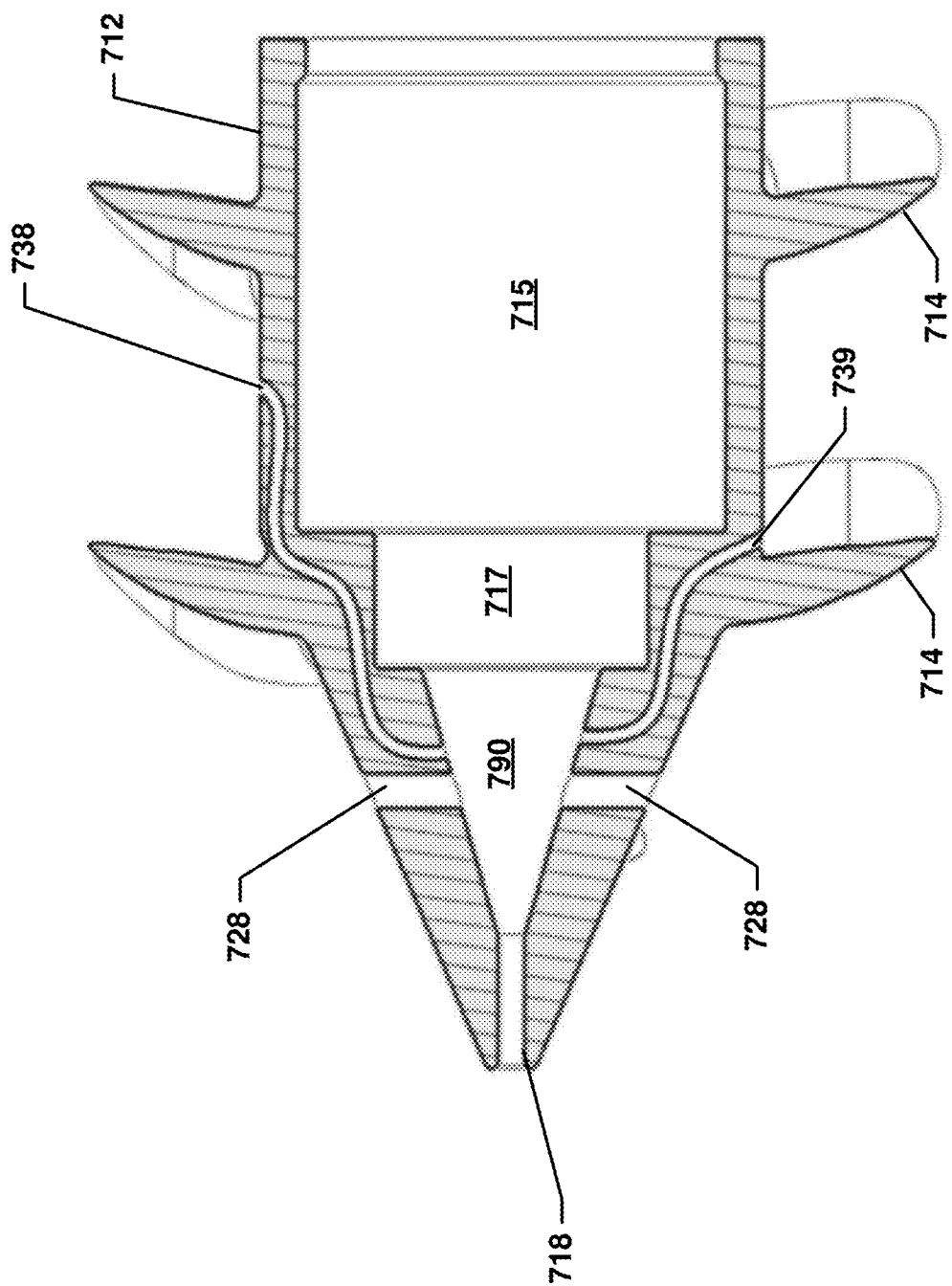
FIG. 7 is a cross-sectional view of a propulsion auger with lateral fluid nozzles in accordance with various embodiments.

FIG. 7 is a cross-sectional view of another alternative forward propulsion auger 712 in accordance with some embodiments. The illustrated alternative forward propulsion auger 712 includes sets of auger blades 714 radially protruding there from. In addition, the alternative forward propulsion auger 712 includes a first receiving chamber 715 configured to receive the forward chassis section (e.g., 610 in FIG. 6B) therein. In addition, the alternative forward propulsion auger 712 may include a second receiving chamber 717 configured to receive an auger hub (e.g., 670 in FIG. 6B) that may transfer rotation to the alternative forward propulsion auger 712.

Additionally, the alternative forward propulsion auger 712 may include more than one fluid nozzle. In particular, in addition a forward fluid nozzle 718, which is similar to the forward fluid nozzles 118, 618 described above with regard to FIGS. 1, 6A, and 6B, the alternative forward propulsion auger 712 may include one or more forward lateral nozzles 728 and one or more central lateral nozzles 738, 739. The forward fluid nozzle 718 may connect an outer fluid chamber 790 to an exterior region in front of the alternative forward propulsion auger 712. The outer fluid chamber 790 may be a cavity formed between an inside of the alternative forward propulsion auger 712 and a forward chassis section (e.g., 610 in FIG. 6B). Primary fluid ejected from the forward fluid nozzle 718 may help fluidize the viscous mixture directly in front of the alternative forward propulsion auger 712. The one or more forward lateral nozzles 728 may connect the outer fluid chamber 790 to an exterior region laterally adjacent a front of the alternative forward propulsion auger 712. Similarly, the one or more central lateral nozzles 738, 739 may connect the outer fluid chamber 790 to an exterior region laterally adjacent a side of the alternative forward propulsion auger 712.

The forward propulsion augers (e.g., 112, 612, 712) of various embodiments may include a greater number of fluid nozzles, fluid nozzles in different locations, and/or fluid nozzles in a different pattern of locations.

The robots described in some of the embodiments above included vibrators that vibrate an entire shell of the chassis (e.g., 105, 205, 505, 610). However, those chassis house electronics, which may get compromised from repeated vibrations. Thus, various embodiments isolate the vibrations of the vibrator from the chassis or rotational augers.

Figure 8:
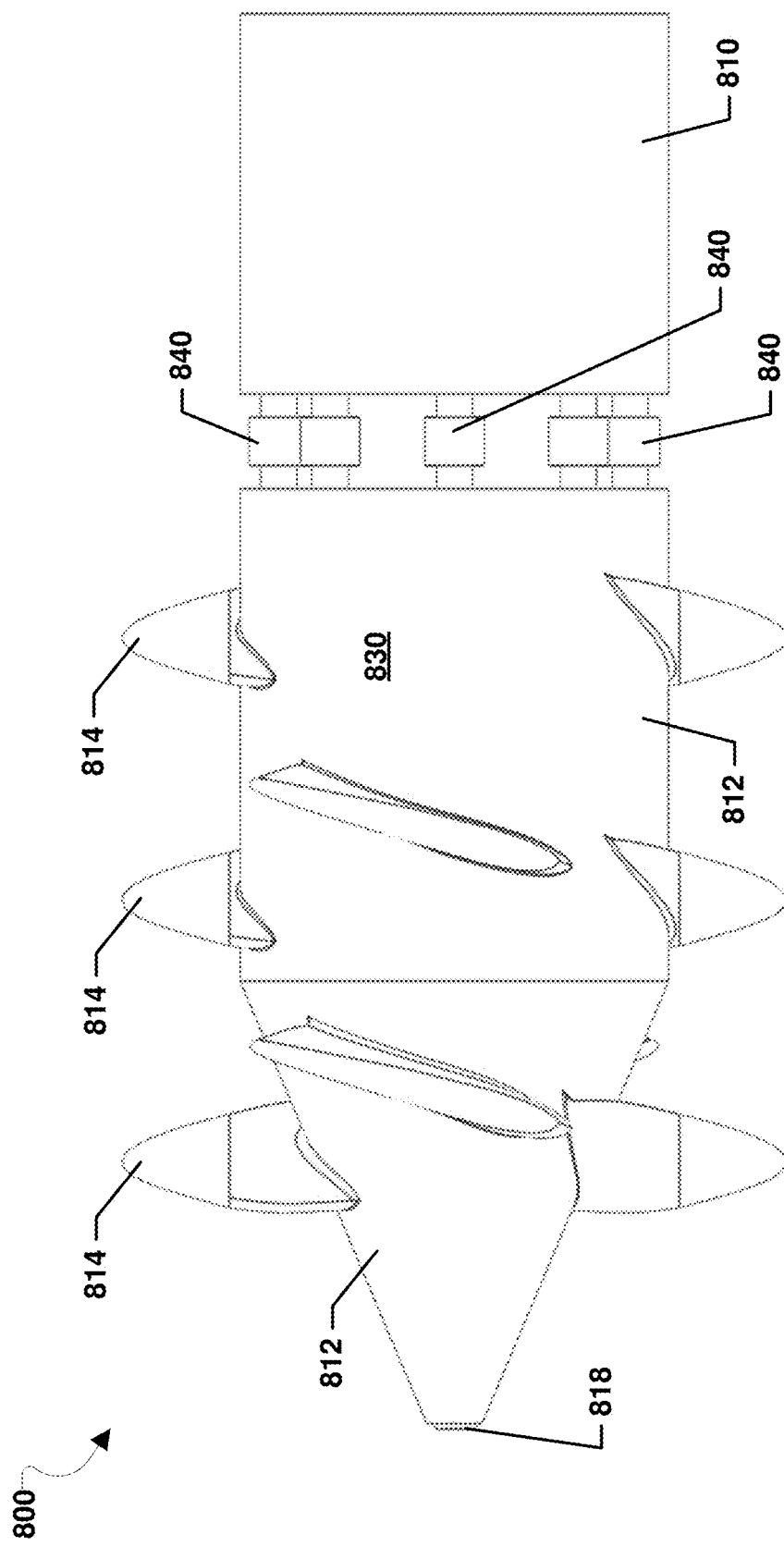
FIG. 8 is a side view of forward portion of a robot for maneuvering through viscous mixtures with isolation dampers between a vibrating auger and a chassis in accordance with various embodiments.

FIG. 8 shows an isolation view of a forward portion of a robot 800 in accordance with various embodiments. In particular, the robot 800 includes a forward chassis section 810 and a forward propulsion auger 812. The robot 800 may include an internal vibrator 830, which is configured to vibrate the forward propulsion auger 812, but dampers 840 are provided to isolate the vibrations from the forward chassis section 810 and the remainder of the robot 800 aft of the forward chassis section 810. In this way, the internal vibrator 830 may cause the forward propulsion auger 812 to vibrate and create liquefaction, independent of the forward chassis section 810, and the main chassis, including the electronics housed therein.

The forward propulsion auger 812 may also include a forward fluid nozzle 818 and other similar elements to the forward and/or rear propulsion augers (e.g., 112, 122, 612, 712) described with regard to FIGS. 1, 6A, 6B, and 7 but with different sets of auger blades 814. As shown, the auger blades 814 may consist of axially offset rows of auger blades, wherein each row of auger blades includes multiple auger blades spaced apart from one another. The robot 800 may additionally include any of the features of the other embodiments described and illustrated herein.

FIGS. 9A-9C show isolation views of a forward portion of a robot 900 in accordance with various embodiments. The robot 900 includes a forward chassis section 910, a forward propulsion auger 912, and an outer sleeve 960 that is configured to vibrate. The vibrations of the outer sleeve 960 are isolated from the forward chassis section 910 and the forward propulsion auger 912. The forward chassis section 910 serves as an inner frame that supports the outer sleeve 960, which surrounds the forward chassis section 910. The outer sleeve 960 may also surround all or part of the forward propulsion auger 912.

The outer sleeve 960 may have a smooth outer surface with a thin or even sharp forward edge for cutting through thick medium (e.g., sludge). The outer sleeve 960 may have bumps or other elements to promote friction between the outer sleeve 960 and the thick medium. These bumps or other elements may help move the material and facilitate liquefaction. For example, the outer sleeve 960 may include internal bumps 965, which are formed as inwardly extending protrusions. Alternatively, the outer sleeve 960 may have a fewer or greater number of internal bumps. In addition, or alternatively, the outer sleeve 960 may include external bumps.

The outer sleeve 960 may be free floating on rails 962, which keep the outer sleeve 960 connected and constrained to the robot 900, while allowing isolated vibrations thereof. Although the outer sleeve 960 appears larger than previously described vibrators (e.g., 130, 132), the outer sleeve 960 may have a smaller mass due to its thin-walled cylindrical design, which may require less power to vibrate while still promoting the liquefaction needed for the robot 900 to move through the thick medium.

FIG. 9C is a cross-sectional view of the robot 900 shown in FIGS. 9A and 9B. As shown, the forward chassis section 910 may house various components including an internal vibrator 930 that is configured to directly cause vibration of the outer sleeve 960. The internal vibrator 930, which may impart axial motion (i.e., left to right in the orientation shown) may be mounted on a rail 962 that is fixed to a support arm 964 that in turn supports the outer sleeve 960. The rail 962 may be slidingly coupled to an inner portion of the forward chassis section 910 through bearings 952, which enable axial movement of the rail 962 relative to the forward chassis section. In this way, vibration by the internal vibrator 930 may impart relative axial movement, in the form of quick minor vibrations, of the outer sleeve 960 that are isolated from the forward chassis section 910 and the forward propulsion auger 912.

The forward propulsion auger 912 may also include a forward fluid nozzle 918 and other similar elements to the forward and/or rear propulsion augers 112, 122, 612, 712, 812 described with regard to FIGS. 1, 6A, 6B, 7, and 8, but with two different axially offset rotational sections 913a, 913b that include sets of auger blades 914, 916. The first rotational section 913a includes a first set of auger blades 914 and the second rotational section 913b includes a second set of auger blades 916. The two different rotational sections 913a, 913b may rotate counter to one another, which means the first and second set of auger blades 914, 916 are also configured to counter-rotate relative to one another.

An internal fluid intake line 980 may be configured to receive fluid from the at least one rear fluid intake port (e.g., 128 in FIG. 1) and/or the external fluid intake line (e.g., 410 in FIG. 4) and direct that fluid to the forward fluid nozzle 918. An onboard and/or remote fluid pump may supply the pressure that causes (i.e., encourages) some of the primary fluid (e.g., 60 in FIG. 4) into the internal fluid intake line 980 and toward a forward fluid nozzle 918. Primary fluid ejected from the forward fluid nozzle 918 may help fluidize the viscous mixture directly in front of, adjacent, and/or surrounding the forward propulsion auger 912 and the outer sleeve 960. The robot 900 may additionally include any of the features of the other embodiments described and illustrated herein.

Figure 10A:
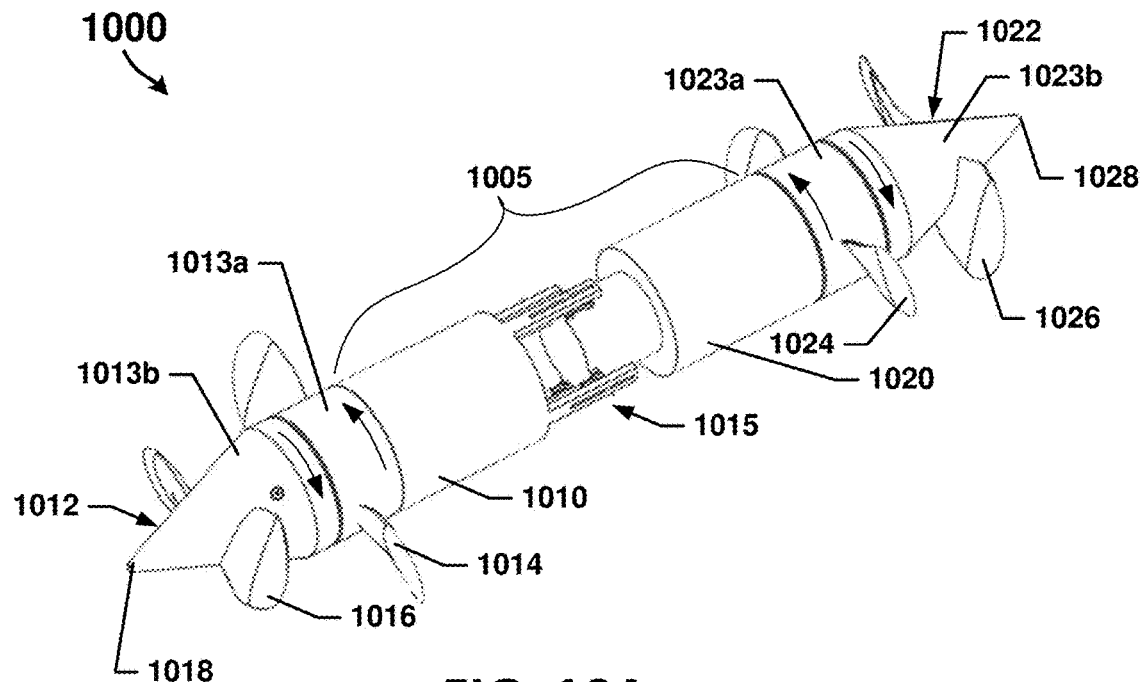
FIG. 10A is a perspective view of a robot with counter-rotating propulsion augers in accordance with various embodiments.
Figure 10B:
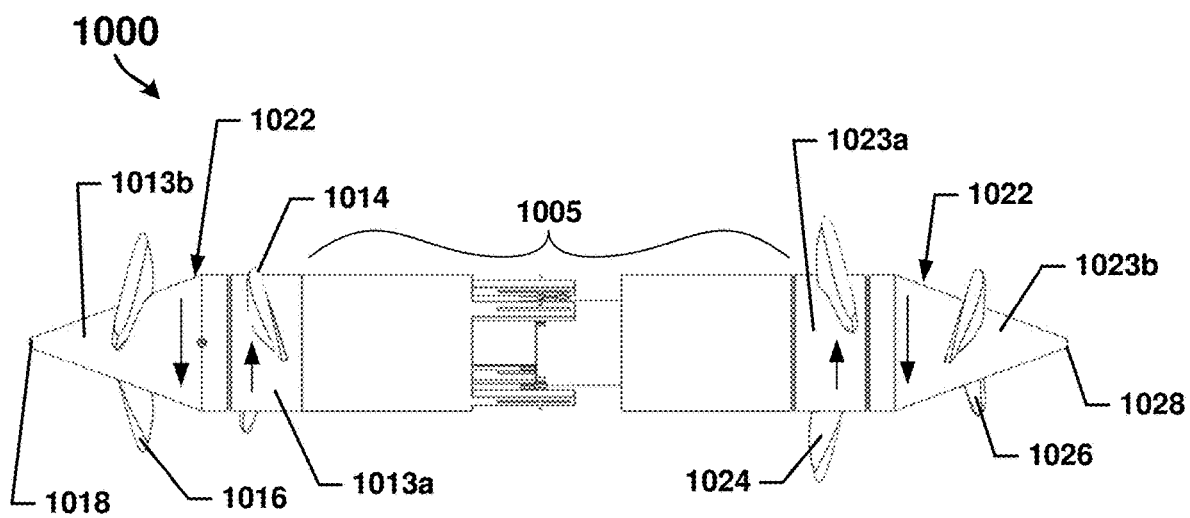
FIG. 10B is a side view of the robot of FIG. 10A in accordance with various embodiments.

FIGS. 10A and 10B are perspective and side views, respectively, of a robot 1000 with dual counter-rotating propulsion augers 1012, 1022 in accordance with various embodiments. The robot 1000 includes a chassis 1005 with forward and rear chassis sections 1010, 1020 and a maneuvering gimbal 1015 disposed between the forward and rear sections 1010, 1020. In addition, the robot 1000 may include a forward fluid nozzle 1018 and a rear fluid nozzle 1028.

Rather than providing counter-rotating augers at opposed ends of an elongate robot, the robot 1000 includes counter-rotating auger blades in close proximity to one another, which may improve robotic movement since changes in material density or viscosity near the robot 1000 tend to be better handled when the counter rotating elements are closer to each other. Thus, each of the counter-rotating propulsion augers 1012, 1022 include separate axially offset sections that support sets of auger blades. A forward counter-rotating propulsion auger 1012 may include a first forward auger section 1013a with a first forward set of auger blades 1014 and a second forward auger section 1013b with a second forward set of auger blades 1016. The first and second forward auger sections 1013a, 1013b rotate opposite to one another. For example, if the first forward auger section 1013a rotates clockwise, the second forward auger section 1013b will rotate counter-clockwise. Similarly, a rear counter-rotating propulsion auger 1022 may include a first rear auger section 1023a with a first rear set of auger blades 1024 and a second rear auger section 1023b with a second rear set of auger blades 1026. If the first rear auger section 1023a rotates clockwise, the second rear auger section 1023b will rotate counter-clockwise. The inclination angle of the auger blades 1014, 1016, 1024, 1026 should be such that when all auger sections (e.g., 1013a, 1013b, 1023a, 1023b) rotate in unison they cooperate to induce propulsion in the same maneuvering direction (i.e., forward or backward) of the robot 1000.

In FIGS. 10A and 10B, the clockwise direction is illustrated by the upward pointing arrows and the counter-clockwise direction is illustrated by the downward pointing arrows. The robot 1000 may additionally include any of the features of the other embodiments described and illustrated herein.

Figure 11:
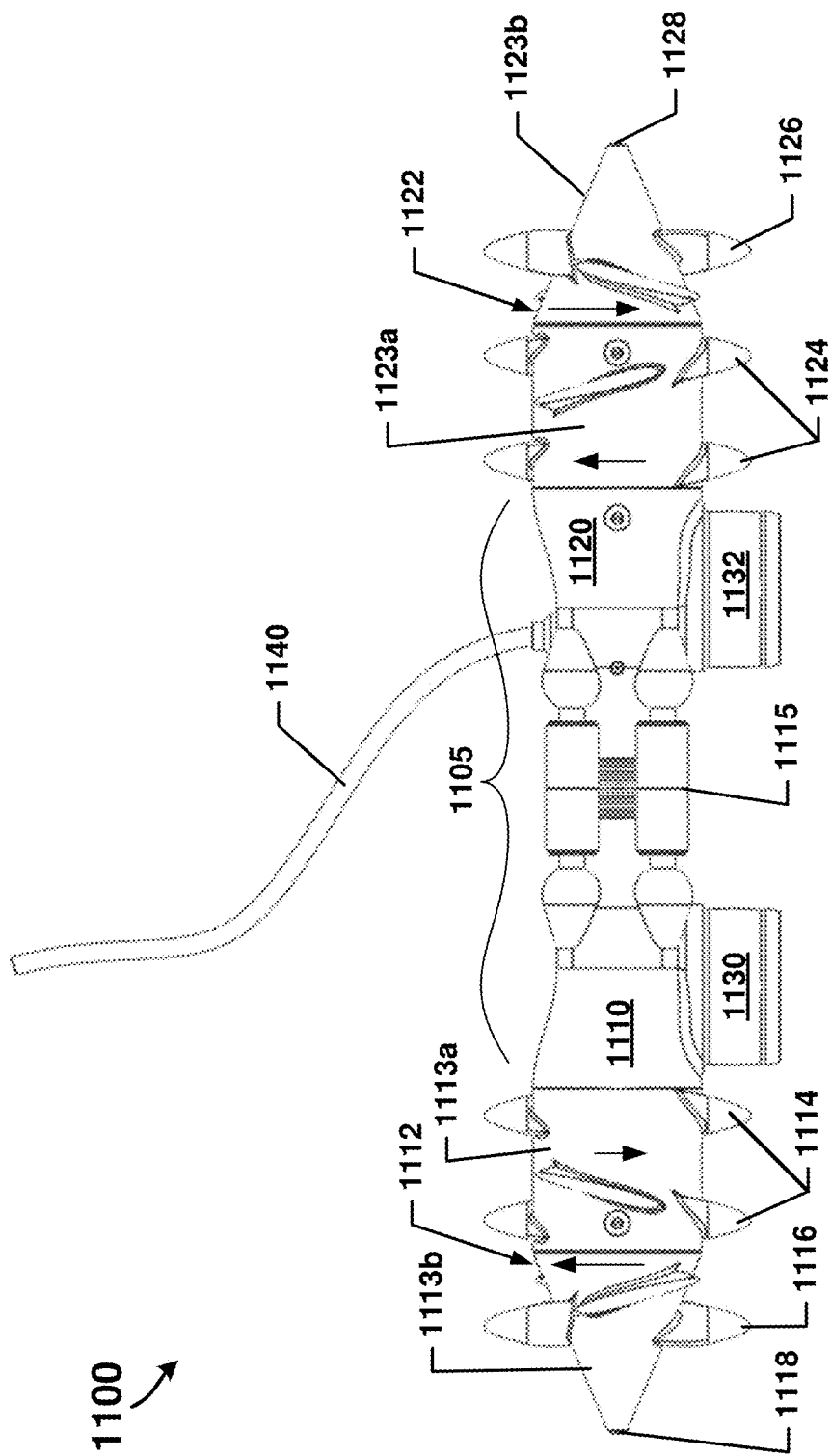
FIG. 11 is a side view of a robot for maneuvering through viscous mixtures with dual-counter rotational augers in accordance with various embodiments.

FIG. 11A is a side view of a robot with enhanced dual counter-rotating propulsion augers in accordance with various embodiments. The robot 1100 includes a chassis 1105 with forward and rear chassis sections 1110, 1120 and a maneuvering gimbal 1115 disposed between the forward and rear sections 1110, 1120. In addition, the robot 1100 includes counter-rotating propulsion augers 1112, 1122, which each include separate axially offset sections that support sets of auger blades. Similar to the robot (e.g., 100) described with regard to FIG. 1, the robot 1100 may include external vibrators 1130, 1132.

The robot 1100 may include a combined fluid intake and power line 1140. The combined fluid intake and power line 1140 may supply primary fluid from a remote part of the tank (e.g., 50). The combined fluid intake and power line 1140 may be coupled to the chassis 1105 such that fluid may be directed to either a forward fluid nozzle 1118 or a rear fluid port 1128, depending on the maneuvering direction (i.e., forward or backward) of the robot 1100. In addition, the combined fluid intake and power line 1140 may supply power to the various components of the robot 1100, including motors, pumps, actuators, sensors, etc.

A forward counter-rotating propulsion auger 1112 may include a first forward auger section 1113a with a first forward set of auger blades 1114. The first forward auger section 1113a may include multiple axially offset rows of separate auger blades 1114. In addition, the forward counter-rotating propulsion auger 1112 may include a second forward auger section 1113b with a second forward set of auger blades 1116. The first and second forward auger sections 1113a, 1113b rotate opposite to one another. For example, if the first forward auger section 1113a rotates clockwise, the second forward auger section 1113b will rotate counter-clockwise. Similarly, a rear counter-rotating propulsion auger 1122 may include a first rear auger section 1123a with a first rear set of auger blades 1124 and a second rear auger section 1123b with a second rear set of auger blades 1126. The first rear auger section 1123a may include multiple axially offset rows of separate auger blades 1124. If the first rear auger section 1123a rotates clockwise, the second rear auger section 1123b will rotate counter-clockwise. The inclination angle of the auger blades 1114, 1116, 1124, 1126 should be such that when all auger sections (e.g., 1113a, 1113b, 1123a, 1123b) rotate in unison they cooperate to induce propulsion in the same maneuvering direction (i.e., forward or backward) of the robot 1100.

In FIGS. 11A and 11B, the clockwise direction is illustrated by the upward pointing arrows and the counter-clockwise direction is illustrated by the downward pointing arrows. The robot 1100 may additionally include any of the features of the other embodiments described and illustrated herein.

Figure 12A:
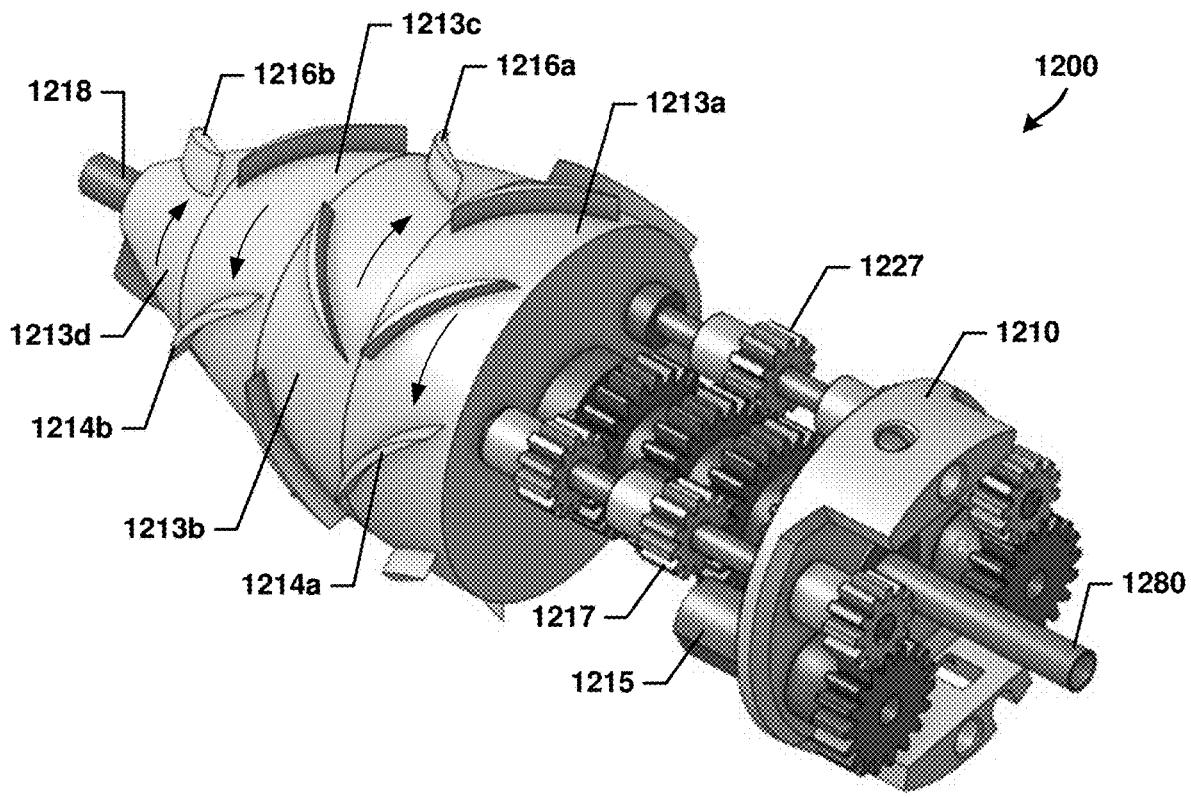
FIGS. 12A-12B are perspective views of a propulsion auger with two pairs of counter-rotating auger blades in accordance with various embodiments.
Figure 12B:
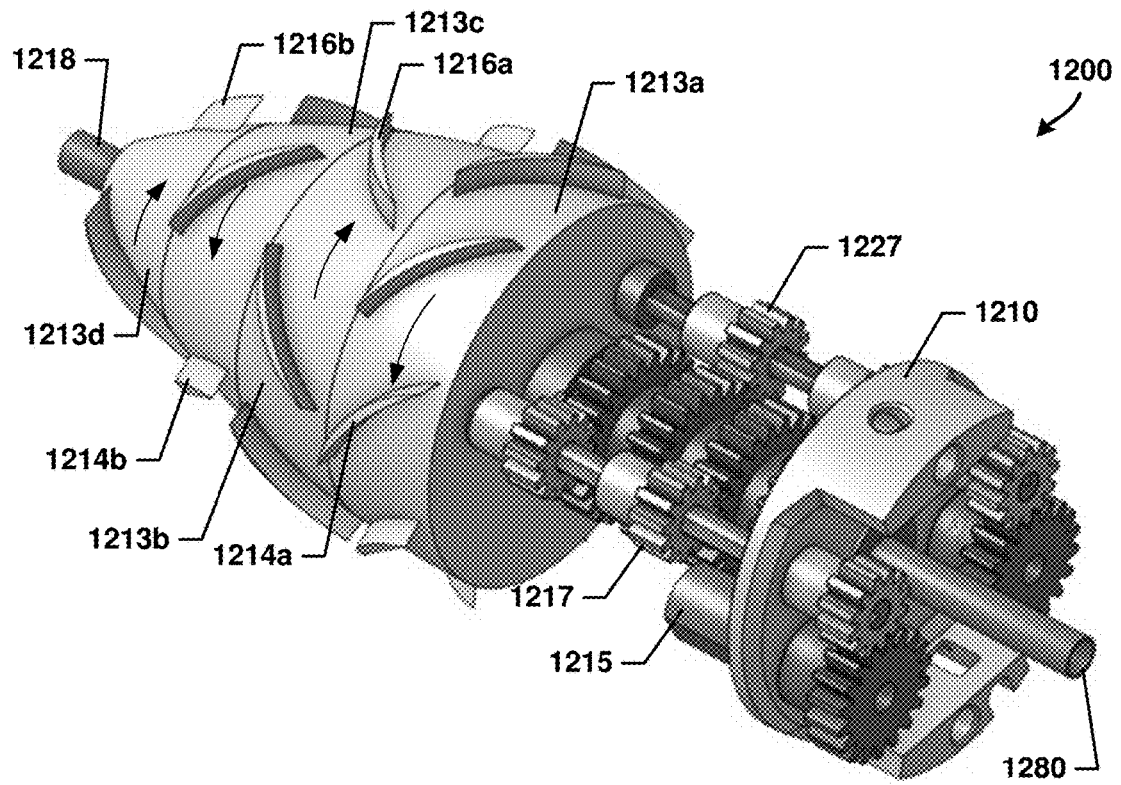

FIGS. 12A and 12B are perspective views of a four-section counter rotational propulsion auger 1200 in accordance with various embodiments. Propulsion and maneuverability may benefit from maximizing the external surface area of the robot with auger blades. For example, a robot with multiple rows of auger blades will have improved propulsion and maneuverability over a robot with fewer rows of auger blades. The four-section counter rotational propulsion auger 1200 includes a chassis coupling frame 1210, driver mechanisms 1215, 1217, 1227, a first auger section 1213a, a second auger section 1213b, a third auger section 1213c, and a fourth auger section 1213d. Each of the first, second, third, and fourth auger sections 1213a, 1213b, 1213c, 1213d includes sets of auger blades. A first set of auger blades 1214a, 1214b are disposed on the first and third auger sections 1213a, 1213c. The first set of auger blades 1214a, 1214b include two axially offset rows of auger blades configured to rotate in unison and in the same direction. A second set of auger blades 1216a, 1216b are disposed on the second and fourth auger sections 1213c, 1213d. The second set of auger blades 1216a, 1216b include two axially offset rows of auger blades configured to rotate in unison and in the same direction, but in the opposite direction to the first set of auger blades 1214a, 1214b. A first row of the second set of auger blades 1216a is disposed between both rows of the first set of auger blades 1214a, 1214b. Similarly, a second row of the first set of auger blades 1214b is disposed between both rows of the second set of auger blades 1216a, 1216b.

An internal fluid intake line 1280 may be configured to receive fluid from an external fluid intake port (e.g., 128 in FIG. 1 and/or 1140 in FIG. 11) and direct that fluid to the forward fluid nozzle 1218. Primary fluid ejected from the forward fluid nozzle 1218 may help fluidize the viscous mixture directly in front of, adjacent, and/or surrounding the four-section counter rotational propulsion auger 1200.

The dimensions and/or proportions of the robot in accordance with various embodiments may vary as suited for an intended operating environment. Consideration may be given to keeping the chassis size compact and relatively smaller than the propulsion augers. In addition, the chassis may be designed and configured to be waterproof to prevent fluid from interfering with any components therein.

FIGS. 13A-13D are process flow diagrams illustrating example methods 1300-1303 of using a robot according to various embodiments for maneuvering through viscous mixtures. With reference to FIGS. 13A-13D, the methods 1300-1303 and the operations thereof may be performed using a robot (e.g., 100, 500, 600) configured to maneuver through viscous mixtures. The operations of the methods 1300-1303 may be controlled by an operator or performed by a processor of the robot. In this way, the robot may be run as a non-autonomous, semi-autonomous, or fully autonomous vehicle.

Figure 13A:
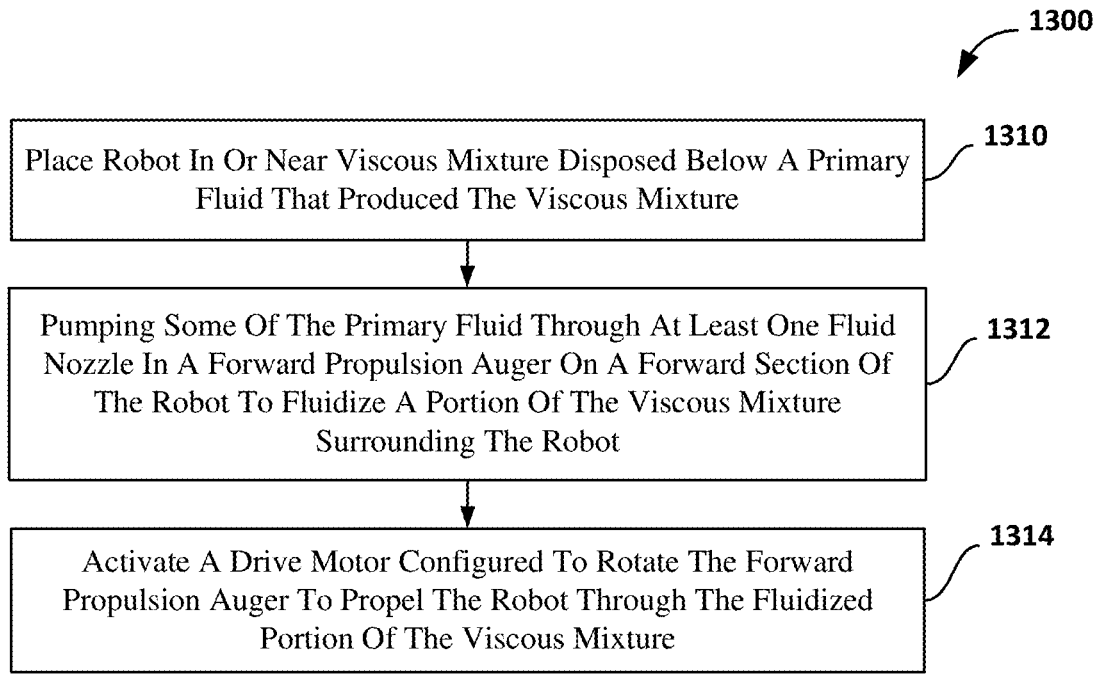
FIGS. 13A-13E are process flow diagrams illustrating methods of using a robot for maneuvering through viscous mixtures in accordance with various embodiments.

Referring to FIG. 13A, in the method 1300, the robot may be placed in or near a viscous mixture in block 1310. The viscous mixture may be disposed below a primary fluid that produced the viscous mixture. The placement of the robot in or near the viscous mixture may be performed by an operator or by the robot's own propulsion systems. For example, the viscous mixture may be the sludge that accumulates at the bottom of an oil tank, in which the primary fluid would be oil.

In block 1312, the primary fluid may be pumped through at least one fluid nozzle in the forward propulsion auger on a forward section of the robot. Pumping the primary fluid through one or more nozzles in the propulsion augers may help to fluidize or dilute the viscous mixture surrounding the robot, thereby facilitating propulsion of the robot through the mixture. Pumping the primary fluid through the one or more nozzles may be performed by a fluid pump within the robot, in which the fluid pump is configured to draw some of the primary fluid through the robot to be ejected from the at least one fluid nozzle in a forward propulsion auger of the robot for fluidizing a portion of the viscous mixture.

In block 1314, a first drive motor configured to rotate the forward propulsion auger may be activated to rotate the forward propulsion auger and thus propel the robot through the fluidized portion of the viscous mixture.

Figure 13B:
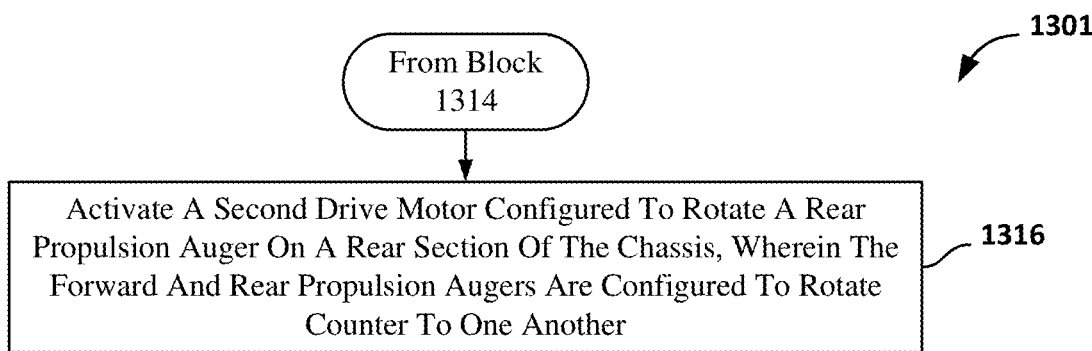

Referring to FIG. 13B, in the method 1301, a second drive motor configured to rotate a rear propulsion auger on a rear end of the chassis may be activated in block 1316. The forward and rear propulsion augers may be configured to rotate counter to one another.

Figure 13C:
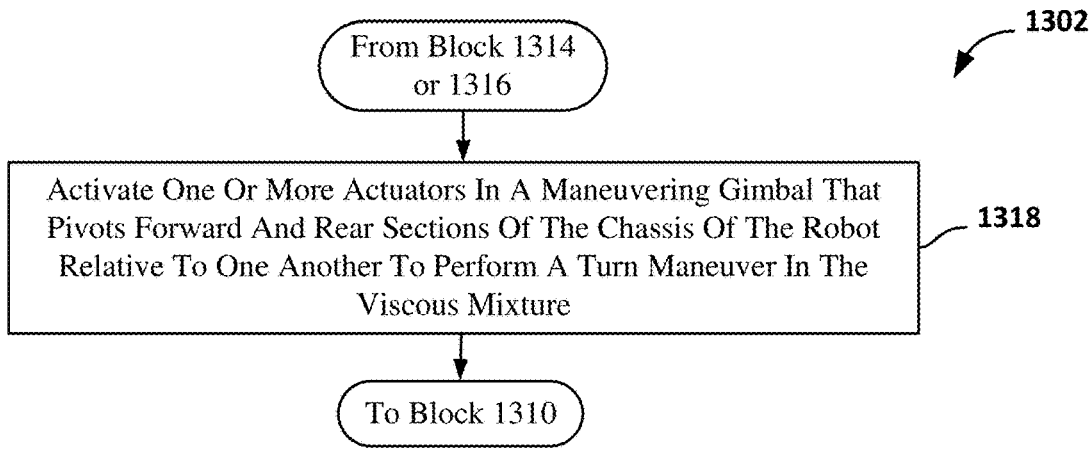

Referring to FIG. 13C, in the method 1302, a maneuvering gimbal that pivots forward and rear sections of a chassis of the robot relative to one another may be activated for performing a turn maneuver in the viscous mixture in block 1318. The forward section of the chassis may support the forward propulsion auger.

Figure 13D:
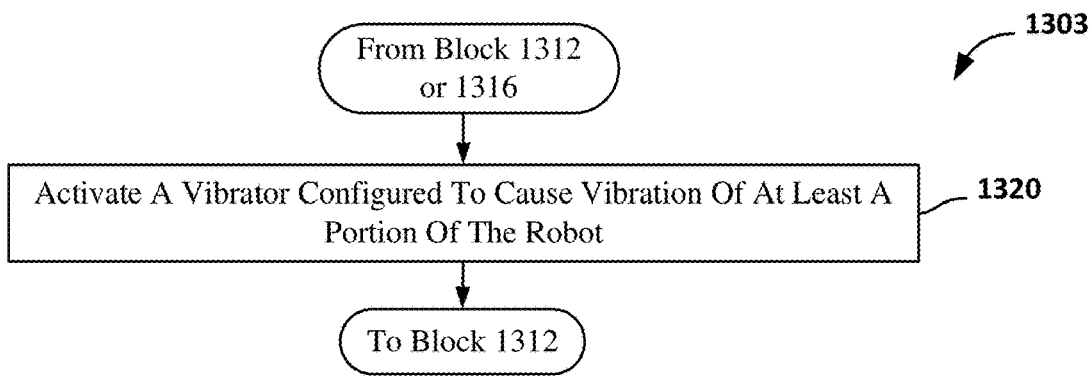

Referring to FIG. 13D, in the method 1303, while rotating the forward propulsion auger and/or the rear propulsion auger in blocks 1312 or 1316, a vibrator configured to cause vibration of at least a portion of the robot may be activated in block 1320. Vibrating various parts of the robot, such as the forward propulsion auger and/or the rear propulsion auger, may serve to fluidize a portion of the viscous mixture in the vicinity of the robot, thereby facilitating movement through the mixture.

Figure 13E:
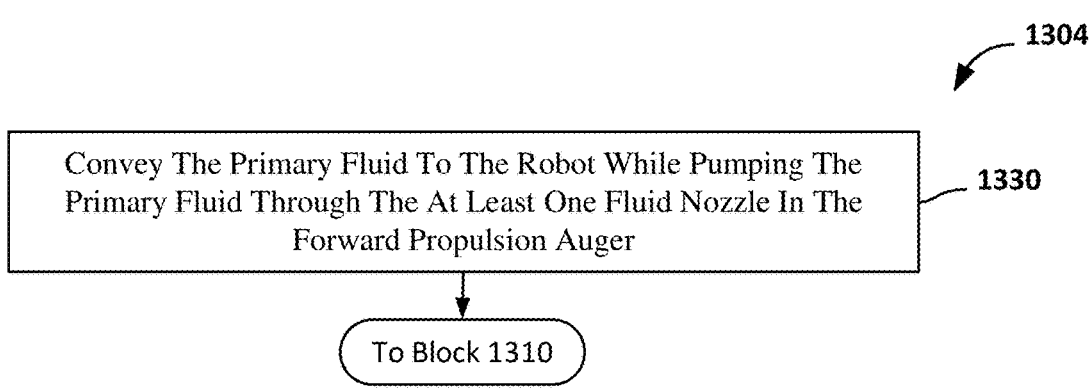

Referring to FIG. 13E, in the method 1304, the robot may be coupled to a remote reservoir of the primary fluid, such as by piping or tubing, and primary fluid may be conveyed to the robot to support pumping of the primary fluid through the at least one fluid nozzle in the forward propulsion auger in block 1330. Pumping the primary fluid through nozzles in the forward propulsion auger may serve to fluidize a portion of the viscous mixture in the vicinity of the robot, thereby facilitating movement through the mixture. Coupling the robot to the reservoir of primary fluid, and beginning to convey the primary fluid to the robot in block 1310 may be performed before as part of positioning the robot in or near the viscus mixture in block 1310.

The foregoing descriptions of systems, devices, and methods are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A robot for maneuvering through viscous mixtures, comprising:
   a chassis comprising:
     a forward section;
     a first drive motor positioned within the forward section;
     a rear section; and
     a maneuvering gimbal coupled between the forward section and the rear section, the maneuvering gimbal including a pivot axis; and
   a forward propulsion auger positioned on a leading end of the forward section and coupled to the first drive motor, the forward propulsion auger comprising at least one fluid nozzle configured to eject a fluid therefrom for fluidizing at least a portion of a viscous mixture adjacent to the forward propulsion auger,
   wherein the forward section and the rear section are configured to be selectively pivoted relative to one another about the pivot axis of the maneuvering gimbal, and
   wherein the forward propulsion auger is configured to be rotated by the first drive motor relative to the forward section about a rotational axis normal to the pivot axis of the maneuvering gimbal.

2. The robot of claim 1, further comprising:
   a second drive motor positioned within the rear section; and
   a rear propulsion auger positioned on the rear section, wherein the rear propulsion auger is configured to be rotated by the second drive motor relative to the rear section about another rotational axis normal to the pivot axis of the maneuvering gimbal.

3. The robot of claim 2, wherein the first drive motor, the second drive motor, the forward propulsion auger and the rear propulsion auger are configured to rotate the forward and rear propulsion augers counter to one another.

4. The robot of claim 1, further comprising:
   a vibrator coupled to the chassis and configured to vibrate at least a portion of the robot.

5. The robot of claim 4, wherein the vibrator is configured to vibrate the chassis.

6. The robot of claim 4, wherein the vibrator is configured to vibrate the forward propulsion auger.

7. The robot of claim 4, wherein the chassis further comprises:
   an inner frame; and
   an outer sleeve surrounding the inner frame,
   wherein the vibrator is configured to vibrate the outer sleeve relative to the inner frame.

8. The robot of claim 4, wherein the vibrator is mounted outside the chassis.

9. The robot of claim 1, further comprising:
   a fluid intake within the chassis and fluidly coupled to the at least one fluid nozzle, wherein the fluid intake is configured to be coupled to a fluid line for providing a primary fluid to the robot from a remote source of fluid.

10. The robot of claim 1, further comprising:
    a fluid pump within the chassis and configured to pump the fluid out through the at least one fluid nozzle.

11. The robot of claim 1, further comprising:
one or more gimbal actuator arms in the maneuvering gimbal configured to pivot the forward section and the rear section about the pivot axis.

12. The robot of claim 1, wherein the forward propulsion auger includes a first set of auger blades and a second set of auger blades, wherein the first and second set of auger blades are configured to counter-rotate relative to one another.

13. The robot of claim 12, wherein the first set of auger blades includes two axially offset rows of auger blades configured to rotate in the same directions, wherein at least some of the second set of auger blades are disposed between the two axially offset rows of auger blades.

14. The robot of claim 1, wherein the forward propulsion auger includes axially offset rows of auger blades, wherein at least one of the axially offset rows of auger blades includes multiple auger blades spaced apart from one another.

15. A method of maneuvering a robot through a viscous mixture disposed below a primary fluid that produced the viscous mixture, in which the robot includes a chassis supporting a forward section, a rear section, and a maneuvering gimbal coupled between the forward section and the rear section, the maneuvering gimbal having a pivot axis configured to pivot the forward and rear sections relative to one another about the pivot axis, and a forward propulsion auger positioned on a leading end of the forward section and coupled to a first drive motor, the forward propulsion auger including at least one fluid nozzle configured to eject the primary fluid therefrom, the method comprising:
placing the robot in or near the viscous mixture;
pumping some of the primary fluid through the at least one fluid nozzle in the forward propulsion auger thereby fluidizing a portion of the viscous mixture surrounding the robot; and
activating a drive motor configured to rotate the forward propulsion auger to propel the robot through the fluidized portion of the viscous mixture.

16. The method of claim 15, further comprising:
activating the maneuvering gimbal to pivot the forward section relative to the rear section about the pivot axis to perform a turn maneuver.

17. The method of claim 16, further comprising:
activating a second drive motor configured to rotate a rear propulsion auger positioned on the rear section, wherein the first and second drive motors are configured to rotate the forward and rear propulsion augers counter to one another.

18. The method of claim 15, wherein activating the drive motor to rotate the forward propulsion auger rotates a first set of auger blades and a second set of auger blades counter to one another.

19. The method of claim 15, further comprising:
activating a vibrator within the chassis to vibrate at least a portion of the robot.

20. The method of claim 15, further comprising;
coupling the robot to a remote source of the primary fluid; and
conveying the primary fluid to the robot while pumping the primary fluid through the at least one fluid nozzle in the forward propulsion auger.

\* \* \* \* \*